(12) United States Patent
Boulware et al.

(10) Patent No.: US 9,697,744 B2
(45) Date of Patent: *Jul. 4, 2017

(54) SYSTEM AND METHOD FOR MANUAL WELDER TRAINING

(71) Applicant: Lincoln Global, Inc., City of Industry, CA (US)

(72) Inventors: Paul Christopher Boulware, Columbus, OH (US); Christopher C. Conrardy, Columbus, OH (US); Douglas A. Clark, Columbus, OH (US); M. William Forquer, Columbus, OH (US)

(73) Assignee: Lincoln Global, Inc., Santa Fe Springs, CA (US)

( * ) Notice: Subject to any disclaimer, the term of this patent is extended or adjusted under 35 U.S.C. 154(b) by 500 days.

This patent is subject to a terminal disclaimer.

(21) Appl. No.: 14/293,700

(22) Filed: Jun. 2, 2014

(65) Prior Publication Data

US 2015/0056584 A1 Feb. 26, 2015

Related U.S. Application Data

(63) Continuation-in-part of application No. 13/543,240, filed on Jul. 6, 2012, now Pat. No. 9,221,117.

(51) Int. Cl.
*G09B 19/00* (2006.01)
*G09B 19/24* (2006.01)
(Continued)

(52) U.S. Cl.
CPC ............ *G09B 19/24* (2013.01); *B23K 9/0956* (2013.01); *B23K 9/173* (2013.01); *B23K 9/295* (2013.01); *B23K 9/32* (2013.01); *G09B 25/02* (2013.01)

(58) Field of Classification Search
CPC . G09B 19/24; G09B 9/00; B23K 9/32; B23K 9/0956; B23K 9/0953; G05B 2219/45135
See application file for complete search history.

(56) References Cited

U.S. PATENT DOCUMENTS 317,063 A 5/1885 Wittenstrom
428,459 A 5/1890 Coffin
(Continued)

FOREIGN PATENT DOCUMENTS

CA 2698078 9/2011
CN 1665633 9/2005
(Continued)

OTHER PUBLICATIONS

International Search Report and Written Opinion from PCT/IB2009/006605 dated Feb. 12, 2010.
(Continued)

*Primary Examiner* — Andrew Iwamaye
*Assistant Examiner* — Jerry-Daryl Fletcher
(74) *Attorney, Agent, or Firm* — Calfee, Halter & Griswold LLP

(57) ABSTRACT

A method for manual welder training that includes providing a welding training apparatus that includes both hardware and software components and that is operative to gather and process data in real time, wherein the data is derived from an actual training exercise conducted by a welding trainee; selecting training objectives from a predetermined number of predefined objectives; initializing a curriculum, wherein the curriculum is based on the selected training objectives; performing at least one training exercise, wherein the training exercise is a component of the curriculum; providing real-time feedback to the trainee, wherein the real-time feedback is based on the performance of the trainee during the training exercise; evaluating the performance of the
(Continued)

trainee based on data gathered and processed during the training exercise; optionally, adapting the curriculum based on the trainee's performance evaluation; and awarding credentials or certifications to the trainee following successful completion of the curriculum.

25 Claims, 12 Drawing Sheets

(51) Int. Cl.
  *B23K 9/095* (2006.01)
  *B23K 9/32* (2006.01)
  *G09B 25/02* (2006.01)
  *B23K 9/173* (2006.01)
  *B23K 9/29* (2006.01)

(56) References Cited

U.S. PATENT DOCUMENTS

| | | |
|---|---|---|
| 483,428 A | 9/1892 | Goppin |
| 1,159,119 A | 11/1915 | Springer |
| 1,288,529 A | 12/1918 | Cave |
| 2,326,944 A | 8/1943 | Holand et al. |
| 2,333,192 A | 11/1943 | Mobert |
| D140,630 S | 3/1945 | Garibay |
| D142,377 S | 9/1945 | Dunn |
| D152,049 S | 12/1948 | Welch |
| 2,681,969 A | 6/1954 | Burke |
| D174,208 S | 3/1955 | Abidgaard |
| 2,728,838 A | 12/1955 | Barnes |
| D176,942 S | 2/1956 | Cross |
| 2,894,086 A | 7/1959 | Rizer |
| 3,035,155 A | 5/1962 | Hawk |
| 3,059,519 A | 10/1962 | Stanton |
| 3,356,823 A | 12/1967 | Waters et al. |
| 3,555,239 A | 1/1971 | Kerth |
| 3,562,927 A | 2/1971 | Moskowitz |
| 3,562,928 A | 2/1971 | Schmitt |
| 3,621,177 A | 11/1971 | Freeman et al. |
| 3,654,421 A | 4/1972 | Streetman et al. |
| 3,690,020 A | 9/1972 | McBratnie |
| 3,739,140 A | 6/1973 | Rotilio |
| 3,866,011 A | 2/1975 | Cole |
| 3,867,769 A | 2/1975 | Schow et al. |
| 3,904,845 A | 9/1975 | Minkiewicz |
| 3,988,913 A | 11/1976 | Metcalfe et al. |
| D243,459 S | 2/1977 | Bliss |
| 4,024,371 A | 5/1977 | Drake |
| 4,041,615 A | 8/1977 | Whitehill |
| D247,421 S | 3/1978 | Driscoll |
| 4,124,944 A | 11/1978 | Blair |
| 4,132,014 A | 1/1979 | Schow |
| 4,237,365 A | 12/1980 | Lambros et al. |
| 4,280,041 A | 7/1981 | Kiessling et al. |
| 4,280,137 A | 7/1981 | Ashida et al. |
| 4,314,125 A | 2/1982 | Nakamura |
| 4,354,087 A | 10/1982 | Osterlitz |
| 4,359,622 A | 11/1982 | Dostoomian et al. |
| 4,375,026 A | 2/1983 | Kearney |
| 4,410,787 A | 10/1983 | Kremers et al. |
| 4,429,266 A | 1/1984 | Traadt |
| 4,452,589 A | 6/1984 | Denison |
| D275,292 S | 8/1984 | Bouman |
| D277,761 S | 2/1985 | Korovin et al. |
| 4,525,619 A | 6/1985 | Ide et al. |
| D280,329 S | 8/1985 | Bouman |
| 4,611,111 A | 9/1986 | Baheti et al. |
| 4,616,326 A | 10/1986 | Meier et al. |
| 4,629,860 A | 12/1986 | Lindbom |
| 4,677,277 A | 6/1987 | Cook et al. |
| 4,680,014 A | 7/1987 | Paton et al. |
| 4,689,021 A | 8/1987 | Vasiliev et al. |
| 4,707,582 A | 11/1987 | Beyer |
| 4,716,273 A | 12/1987 | Paton et al. |
| D297,704 S | 9/1988 | Bulow |
| 4,812,614 A | 3/1989 | Wang et al. |
| 4,867,685 A | 9/1989 | Brush et al. |
| 4,877,940 A | 10/1989 | Bangs et al. |
| 4,897,521 A | 1/1990 | Burr |
| 4,907,973 A | 3/1990 | Hon |
| 4,931,018 A | 6/1990 | Herbst et al. |
| 4,973,814 A | 11/1990 | Kojima |
| 4,998,050 A | 3/1991 | Nishiyama et al. |
| 5,034,593 A | 7/1991 | Rice et al. |
| 5,061,841 A | 10/1991 | Richardson |
| 5,089,914 A | 2/1992 | Prescott |
| 5,192,845 A | 3/1993 | Kirmsse et al. |
| 5,206,472 A | 4/1993 | Myking et al. |
| 5,266,930 A | 11/1993 | Ichikawa et al. |
| 5,283,418 A | 2/1994 | Bellows et al. |
| 5,285,916 A | 2/1994 | Ross |
| 5,288,968 A | 2/1994 | Cecil |
| 5,305,183 A | 4/1994 | Teynor |
| 5,320,538 A | 6/1994 | Baum |
| 5,337,611 A | 8/1994 | Fleming et al. |
| 5,360,156 A | 11/1994 | Ishizaka et al. |
| 5,360,960 A | 11/1994 | Shirk |
| 5,362,962 A | 11/1994 | Barborak et al. |
| 5,370,071 A | 12/1994 | Ackermann |
| D359,296 S | 6/1995 | Witherspoon |
| 5,424,634 A | 6/1995 | Goldfarb et al. |
| 5,436,638 A | 7/1995 | Bolas et al. |
| 5,464,957 A | 11/1995 | Kidwell et al. |
| 5,465,037 A | 11/1995 | Huissoon et al. |
| D365,583 S | 12/1995 | Viken |
| 5,493,093 A | 2/1996 | Cecil |
| 5,547,052 A | 8/1996 | Latshaw |
| 5,562,843 A | 10/1996 | Yasumoto |
| 5,670,071 A | 9/1997 | Ueyama et al. |
| 5,676,503 A | 10/1997 | Lang |
| 5,676,867 A | 10/1997 | Allen |
| 5,708,253 A | 1/1998 | Bloch et al. |
| 5,710,405 A | 1/1998 | Solomon et al. |
| 5,719,369 A | 2/1998 | White et al. |
| D392,534 S | 3/1998 | Degen et al. |
| 5,728,991 A | 3/1998 | Takada et al. |
| 5,751,258 A | 5/1998 | Fergason et al. |
| D395,296 S | 6/1998 | Kaya et al. |
| 5,774,110 A | 6/1998 | Edelson |
| D396,238 S | 7/1998 | Schmitt |
| 5,781,258 A | 7/1998 | Debral et al. |
| 5,823,785 A | 10/1998 | Matherne, Jr. |
| 5,835,077 A | 11/1998 | Dao et al. |
| 5,835,277 A | 11/1998 | Hegg |
| 5,845,053 A | 12/1998 | Watanabe et al. |
| 5,877,777 A | 3/1999 | Colwell |
| 5,963,891 A | 10/1999 | Walker et al. |
| 6,008,470 A | 12/1999 | Zhang et al. |
| 6,037,948 A | 3/2000 | Liepa |
| 6,049,059 A | 4/2000 | Kim |
| 6,051,805 A | 4/2000 | Vaidya et al. |
| 6,114,645 A | 9/2000 | Burgess |
| 6,155,475 A | 12/2000 | Ekelof et al. |
| 6,155,928 A | 12/2000 | Burdick |
| 6,230,327 B1 | 5/2001 | Briand et al. |
| 6,236,013 B1 | 5/2001 | Delzenne |
| 6,236,017 B1 | 5/2001 | Smartt et al. |
| 6,242,711 B1 | 6/2001 | Cooper |
| 6,271,500 B1 | 8/2001 | Hirayama et al. |
| 6,301,763 B1 | 10/2001 | Pryor |
| 6,330,938 B1 | 12/2001 | Herve et al. |
| 6,330,966 B1 | 12/2001 | Eissfeller |
| 6,331,848 B1 | 12/2001 | Stove et al. |
| D456,428 S | 4/2002 | Aronson et al. |
| 6,373,465 B2 | 4/2002 | Jolly et al. |
| 6,377,011 B1 | 4/2002 | Ben-Ur |
| D456,828 S | 5/2002 | Aronson et al. |
| 6,396,232 B2 | 5/2002 | Haanpaa et al. |
| D461,383 S | 8/2002 | Blackburn |
| 6,427,352 B1 | 8/2002 | Pfeiffer et al. |
| 6,441,342 B1 | 8/2002 | Hsu |
| 6,445,964 B1 | 9/2002 | White et al. |

(56) References Cited

U.S. PATENT DOCUMENTS

| | | |
|---|---|---|
| 6,492,618 B1 | 12/2002 | Flood et al. |
| 6,506,997 B2 | 1/2003 | Matsuyama |
| 6,552,303 B1 | 4/2003 | Blankenship et al. |
| 6,560,029 B1 | 5/2003 | Dobbie et al. |
| 6,563,489 B1 | 5/2003 | Latypov et al. |
| 6,568,846 B1 | 5/2003 | Cote et al. |
| D475,726 S | 6/2003 | Suga et al. |
| 6,572,379 B1 | 6/2003 | Sears et al. |
| 6,583,386 B1 | 6/2003 | Ivkovich |
| 6,593,540 B1 | 7/2003 | Baker et al. |
| 6,621,049 B2 | 9/2003 | Suzuki |
| 6,624,388 B1 | 9/2003 | Blankenship et al. |
| D482,171 S | 11/2003 | Vui et al. |
| 6,647,288 B2 | 11/2003 | Madill et al. |
| 6,649,858 B2 | 11/2003 | Wakeman |
| 6,655,645 B1 | 12/2003 | Lu et al. |
| 6,660,965 B2 | 12/2003 | Simpson |
| 6,679,702 B1 * | 1/2004 | Rau .................... G09B 9/02 |
| | | 340/435 |
| 6,697,701 B2 | 2/2004 | Hillen et al. |
| 6,697,770 B1 | 2/2004 | Nagetgaal |
| 6,703,585 B2 | 3/2004 | Suzuki |
| 6,708,385 B1 | 3/2004 | Lemelson |
| 6,710,298 B2 | 3/2004 | Eriksson |
| 6,710,299 B2 | 3/2004 | Blankenship et al. |
| 6,715,502 B1 | 4/2004 | Rome et al. |
| D490,347 S | 5/2004 | Meyers |
| 6,730,875 B2 | 5/2004 | Hsu |
| 6,734,393 B1 | 5/2004 | Friedl et al. |
| 6,744,011 B1 | 6/2004 | Hu et al. |
| 6,750,428 B2 | 6/2004 | Okamoto et al. |
| 6,765,584 B1 | 7/2004 | Wloka et al. |
| 6,772,802 B2 | 8/2004 | Few |
| 6,788,442 B1 | 9/2004 | Potin et al. |
| 6,795,778 B2 | 9/2004 | Dodge et al. |
| 6,798,974 B1 | 9/2004 | Nakano et al. |
| 6,857,533 B1 | 2/2005 | Hartman et al. |
| 6,858,817 B2 | 2/2005 | Blankenship et al. |
| 6,865,926 B2 | 3/2005 | O'Brien et al. |
| D504,449 S | 4/2005 | Butchko |
| 6,920,371 B2 | 7/2005 | Hillen et al. |
| 6,940,039 B2 | 9/2005 | Blankenship et al. |
| 6,982,700 B2 | 1/2006 | Rosenberg et al. |
| 7,021,937 B2 | 4/2006 | Simpson et al. |
| 7,024,342 B1 | 4/2006 | Waite |
| 7,110,859 B2 | 9/2006 | Shibata et al. |
| 7,126,078 B2 | 10/2006 | Demers et al. |
| 7,132,617 B2 | 11/2006 | Lee et al. |
| 7,170,032 B2 | 1/2007 | Flood |
| 7,194,447 B2 | 3/2007 | Harvey |
| 7,233,837 B2 | 6/2007 | Swain et al. |
| 7,247,814 B2 | 7/2007 | Ott |
| D555,446 S | 11/2007 | Ibarrondo |
| 7,298,535 B2 | 11/2007 | Kuutti |
| 7,315,241 B1 | 1/2008 | Daily et al. |
| D561,973 S | 2/2008 | Kinsley et al. |
| 7,353,715 B2 | 4/2008 | Myers |
| 7,363,137 B2 | 4/2008 | Brant et al. |
| 7,375,304 B2 | 5/2008 | Kainec et al. |
| 7,381,923 B2 | 6/2008 | Gordon et al. |
| 7,414,595 B1 | 8/2008 | Muffler |
| 7,465,230 B2 | 12/2008 | LeMay et al. |
| 7,474,760 B2 | 1/2009 | Hertzman et al. |
| 7,478,108 B2 | 1/2009 | Townsend et al. |
| 7,487,018 B2 | 2/2009 | Afshar et al. |
| D587,975 S | 3/2009 | Aronson et al. |
| 7,516,022 B2 | 4/2009 | Lee et al. |
| 7,580,821 B2 | 8/2009 | Schirm |
| D602,057 S | 10/2009 | Osicki |
| 7,621,171 B2 | 11/2009 | O'Brien |
| D606,102 S | 12/2009 | Bender et al. |
| 7,643,890 B1 | 1/2010 | Hillen et al. |
| 7,687,741 B2 | 3/2010 | Kainec et al. |
| D614,217 S | 4/2010 | Peters et al. |
| D615,573 S | 5/2010 | Peters et al. |
| 7,817,162 B2 | 10/2010 | Bolick et al. |
| 7,853,645 B2 | 12/2010 | Brown et al. |
| D631,074 S | 1/2011 | Peters et al. |
| 7,874,921 B2 | 1/2011 | Baszucki et al. |
| 7,970,172 B1 | 6/2011 | Hendrickson |
| 7,972,129 B2 | 7/2011 | O'Donoghue |
| 7,991,587 B2 | 8/2011 | Ihn |
| 8,069,017 B2 | 11/2011 | Hallquist |
| 8,224,881 B1 | 7/2012 | Spear et al. |
| 8,248,324 B2 | 8/2012 | Nangle |
| 8,265,886 B2 | 9/2012 | Bisiaux et al. |
| 8,274,013 B2 | 9/2012 | Wallace |
| 8,287,522 B2 | 10/2012 | Moses et al. |
| 8,301,286 B2 | 10/2012 | Babu |
| 8,316,462 B2 | 11/2012 | Becker et al. |
| 8,363,048 B2 | 1/2013 | Gering |
| 8,365,603 B2 | 2/2013 | Lesage et al. |
| 8,512,043 B2 | 8/2013 | Choquet |
| 8,569,646 B2 | 10/2013 | Daniel et al. |
| 8,592,723 B2 | 11/2013 | Davidson et al. |
| 8,657,605 B2 | 2/2014 | Wallace et al. |
| 8,692,157 B2 | 4/2014 | Daniel et al. |
| 8,747,116 B2 | 6/2014 | Zboray et al. |
| 8,777,629 B2 | 7/2014 | Kreindl et al. |
| 8,787,051 B2 | 7/2014 | Chang et al. |
| 8,834,168 B2 | 9/2014 | Peters et al. |
| 8,851,896 B2 | 10/2014 | Wallace et al. |
| 8,911,237 B2 | 12/2014 | Postlewaite et al. |
| 8,915,740 B2 | 12/2014 | Zboray et al. |
| RE45,398 E | 3/2015 | Wallace |
| 8,992,226 B1 | 3/2015 | Leach et al. |
| 9,011,154 B2 | 4/2015 | Kindig et al. |
| 9,293,056 B2 | 3/2016 | Zboray |
| 9,293,057 B2 | 3/2016 | Zboray |
| 2001/0045808 A1 | 11/2001 | Heitmann et al. |
| 2001/0052893 A1 | 12/2001 | Jolly et al. |
| 2002/0032553 A1 | 3/2002 | Simpson et al. |
| 2002/0039138 A1 | 4/2002 | Edelson et al. |
| 2002/0046999 A1 | 4/2002 | Veikkolainen et al. |
| 2002/0050984 A1 | 5/2002 | Roberts |
| 2002/0054211 A1 | 5/2002 | Edelson et al. |
| 2002/0085843 A1 | 7/2002 | Mann |
| 2002/0094026 A1 | 7/2002 | Edelson |
| 2002/0111557 A1 | 8/2002 | Madill et al. |
| 2002/0135695 A1 | 9/2002 | Edelson et al. |
| 2002/0175897 A1 | 11/2002 | Pelosi |
| 2002/0180761 A1 | 12/2002 | Edelson et al. |
| 2003/0000931 A1 | 1/2003 | Ueda et al. |
| 2003/0002740 A1 | 1/2003 | Melikian |
| 2003/0023592 A1 | 1/2003 | Modica et al. |
| 2003/0025884 A1 | 2/2003 | Hamana et al. |
| 2003/0073065 A1 * | 4/2003 | Riggs .................... G09B 5/00 |
| | | 434/350 |
| 2003/0075534 A1 | 4/2003 | Okamoto |
| 2003/0106787 A1 | 6/2003 | Santilli |
| 2003/0111451 A1 | 6/2003 | Blankenship et al. |
| 2003/0172032 A1 | 9/2003 | Choquet |
| 2003/0186199 A1 | 10/2003 | McCool et al. |
| 2003/0228560 A1 | 12/2003 | Seat et al. |
| 2003/0234885 A1 | 12/2003 | Pilu |
| 2004/0020907 A1 | 2/2004 | Zauner et al. |
| 2004/0035990 A1 | 2/2004 | Ackeret |
| 2004/0050824 A1 | 3/2004 | Samler |
| 2004/0088071 A1 | 5/2004 | Kouno |
| 2004/0140301 A1 | 7/2004 | Blankenship et al. |
| 2004/0181382 A1 | 9/2004 | Hu |
| 2005/0007504 A1 | 1/2005 | Fergason |
| 2005/0017152 A1 | 1/2005 | Fergason |
| 2005/0046584 A1 | 3/2005 | Breed |
| 2005/0050168 A1 | 3/2005 | Wen et al. |
| 2005/0101767 A1 | 5/2005 | Clapham et al. |
| 2005/0103766 A1 | 5/2005 | Iizuka et al. |
| 2005/0103767 A1 | 5/2005 | Kainec et al. |
| 2005/0109735 A1 | 5/2005 | Flood |
| 2005/0128186 A1 | 6/2005 | Shahoian et al. |
| 2005/0133488 A1 | 6/2005 | Blankenship |
| 2005/0159840 A1 | 7/2005 | Lin et al. |
| 2005/0163364 A1 | 7/2005 | Beck |
| 2005/0189336 A1 | 9/2005 | Ku |

(56) References Cited

U.S. PATENT DOCUMENTS

| | | |
|---|---|---|
| 2005/0199602 A1 | 9/2005 | Kaddani et al. |
| 2005/0230573 A1 | 10/2005 | Ligertwood |
| 2005/0252897 A1 | 11/2005 | Hsu et al. |
| 2005/0275913 A1 | 12/2005 | Vesely et al. |
| 2005/0275914 A1 | 12/2005 | Vesely et al. |
| 2006/0014130 A1 | 1/2006 | Weinstein |
| 2006/0076321 A1 | 4/2006 | Maev |
| 2006/0136183 A1 | 6/2006 | Choquet |
| 2006/0140502 A1 | 6/2006 | Tseng et al. |
| 2006/0154226 A1 | 7/2006 | Maxfield |
| 2006/0163227 A1 | 7/2006 | Hillen et al. |
| 2006/0166174 A1 | 7/2006 | Rowe |
| 2006/0169682 A1 | 8/2006 | Kainec et al. |
| 2006/0173619 A1 | 8/2006 | Brant et al. |
| 2006/0189260 A1 | 8/2006 | Sung |
| 2006/0207980 A1 | 9/2006 | Jocovetty et al. |
| 2006/0213892 A1 | 9/2006 | Ott |
| 2006/0214924 A1 | 9/2006 | Kawamoto et al. |
| 2006/0226137 A1 | 10/2006 | Huismann et al. |
| 2006/0241432 A1 | 10/2006 | Herline et al. |
| 2006/0252543 A1 | 11/2006 | Van Noland et al. |
| 2006/0258447 A1 | 11/2006 | Baszucki et al. |
| 2007/0034611 A1 | 2/2007 | Drius et al. |
| 2007/0038400 A1 | 2/2007 | Lee et al. |
| 2007/0045488 A1 | 3/2007 | Shin |
| 2007/0088536 A1 | 4/2007 | Ishikawa |
| 2007/0112889 A1 | 5/2007 | Cook et al. |
| 2007/0188606 A1 | 8/2007 | Atkinson et al. |
| 2007/0198117 A1 | 8/2007 | Wajhuddin |
| 2007/0211026 A1 | 9/2007 | Ohta et al. |
| 2007/0221797 A1 | 9/2007 | Thompson et al. |
| 2007/0256503 A1 | 11/2007 | Wong et al. |
| 2007/0264620 A1 | 11/2007 | Maddix et al. |
| 2007/0277611 A1 | 12/2007 | Portzgen et al. |
| 2007/0291035 A1 | 12/2007 | Vesely et al. |
| 2008/0021311 A1 | 1/2008 | Goldbach |
| 2008/0027594 A1 | 1/2008 | Jump et al. |
| 2008/0031774 A1 | 2/2008 | Magnant et al. |
| 2008/0038702 A1 | 2/2008 | Choquet |
| 2008/0078811 A1 | 4/2008 | Hillen et al. |
| 2008/0078812 A1 | 4/2008 | Peters et al. |
| 2008/0107345 A1 | 5/2008 | Melikian |
| 2008/0117203 A1 | 5/2008 | Gering |
| 2008/0120075 A1 | 5/2008 | Wloka |
| 2008/0128398 A1 | 6/2008 | Schneider |
| 2008/0135533 A1 | 6/2008 | Ertmer et al. |
| 2008/0140815 A1 | 6/2008 | Brant et al. |
| 2008/0149686 A1 | 6/2008 | Daniel et al. |
| 2008/0203075 A1 | 8/2008 | Feldhausen et al. |
| 2008/0233550 A1 | 9/2008 | Solomon |
| 2008/0249998 A1 | 10/2008 | Dettinger et al. |
| 2008/0303197 A1 | 12/2008 | Paquette et al. |
| 2008/0314887 A1 | 12/2008 | Stoger et al. |
| 2009/0015585 A1 | 1/2009 | Klusza |
| 2009/0021514 A1 | 1/2009 | Klusza |
| 2009/0035740 A1* | 2/2009 | Reed ............... G09B 23/288 434/265 |
| 2009/0045183 A1 | 2/2009 | Artelsmair et al. |
| 2009/0057286 A1 | 3/2009 | Ihara et al. |
| 2009/0109128 A1 | 4/2009 | Nangle |
| 2009/0148821 A1* | 6/2009 | Carkner ............ G09B 23/288 434/265 |
| 2009/0152251 A1 | 6/2009 | Dantinne et al. |
| 2009/0173726 A1 | 7/2009 | Davidson et al. |
| 2009/0184098 A1 | 7/2009 | Daniel et al. |
| 2009/0197228 A1 | 8/2009 | Afshar et al. |
| 2009/0200281 A1 | 8/2009 | Hampton |
| 2009/0200282 A1 | 8/2009 | Hampton |
| 2009/0231423 A1 | 9/2009 | Becker et al. |
| 2009/0257655 A1 | 10/2009 | Melikian |
| 2009/0259444 A1 | 10/2009 | Dolansky et al. |
| 2009/0298024 A1 | 12/2009 | Batzler et al. |
| 2009/0312958 A1 | 12/2009 | Dai et al. |
| 2009/0325699 A1 | 12/2009 | Delgiannidis |
| 2010/0012017 A1 | 1/2010 | Miller |
| 2010/0012637 A1 | 1/2010 | Jaeger |
| 2010/0021051 A1 | 1/2010 | Melikian |
| 2010/0048273 A1 | 2/2010 | Wallace et al. |
| 2010/0062405 A1 | 3/2010 | Zboray et al. |
| 2010/0062406 A1 | 3/2010 | Zboray et al. |
| 2010/0096373 A1 | 4/2010 | Hillen et al. |
| 2010/0121472 A1 | 5/2010 | Babu et al. |
| 2010/0133247 A1 | 6/2010 | Mazumder et al. |
| 2010/0133250 A1 | 6/2010 | Sardy et al. |
| 2010/0176107 A1 | 7/2010 | Bong |
| 2010/0201803 A1 | 8/2010 | Melikian |
| 2010/0224610 A1 | 9/2010 | Wallace |
| 2010/0276396 A1 | 11/2010 | Cooper |
| 2010/0299101 A1 | 11/2010 | Shimada et al. |
| 2010/0307249 A1 | 12/2010 | Lesage et al. |
| 2011/0006047 A1 | 1/2011 | Penrod |
| 2011/0048273 A1 | 3/2011 | Colon |
| 2011/0052046 A1 | 3/2011 | Melikian |
| 2011/0060568 A1 | 3/2011 | Goldfine |
| 2011/0082728 A1 | 4/2011 | Melikian |
| 2011/0091846 A1 | 4/2011 | Kreindl et al. |
| 2011/0114615 A1 | 5/2011 | Daniel et al. |
| 2011/0116076 A1 | 5/2011 | Chantry et al. |
| 2011/0117527 A1 | 5/2011 | Conrardy |
| 2011/0122495 A1 | 5/2011 | Togashi |
| 2011/0183304 A1 | 7/2011 | Wallace et al. |
| 2011/0187746 A1 | 8/2011 | Suto et al. |
| 2011/0187859 A1 | 8/2011 | Edelson |
| 2011/0229864 A1* | 9/2011 | Short ...................... G09B 7/00 434/219 |
| 2011/0248864 A1 | 10/2011 | Becker et al. |
| 2011/0316516 A1 | 12/2011 | Schiefermuller et al. |
| 2012/0189993 A1 | 7/2012 | Kinding et al. |
| 2012/0291172 A1 | 11/2012 | Wills et al. |
| 2012/0298640 A1 | 11/2012 | Conrardy |
| 2013/0026150 A1 | 1/2013 | Chantry et al. |
| 2013/0040270 A1 | 2/2013 | Albrecht |
| 2013/0049976 A1 | 2/2013 | Maggiore |
| 2013/0075380 A1 | 3/2013 | Albrech et al. |
| 2013/0119040 A1 | 5/2013 | Suraba et al. |
| 2013/0170259 A1 | 7/2013 | Chang et al. |
| 2013/0182070 A1 | 7/2013 | Peters et al. |
| 2013/0183645 A1 | 7/2013 | Wallace et al. |
| 2013/0189657 A1 | 7/2013 | Wallace et al. |
| 2013/0189658 A1 | 7/2013 | Peters et al. |
| 2013/0203029 A1 | 8/2013 | Choquet |
| 2013/0206740 A1 | 8/2013 | Pfeifer et al. |
| 2013/0209976 A1 | 8/2013 | Postlewaite et al. |
| 2013/0230832 A1 | 9/2013 | Peters et al. |
| 2013/0231980 A1 | 9/2013 | Elgart et al. |
| 2013/0252214 A1 | 9/2013 | Choquet |
| 2013/0288211 A1 | 10/2013 | Patterson et al. |
| 2013/0327747 A1 | 12/2013 | Dantinne |
| 2013/0342678 A1 | 12/2013 | McAninch et al. |
| 2014/0038143 A1 | 2/2014 | Daniel |
| 2014/0042136 A1 | 2/2014 | Daniel et al. |
| 2014/0134580 A1 | 5/2014 | Becker |
| 2014/0263224 A1 | 9/2014 | Becker |
| 2014/0272835 A1 | 9/2014 | Becker |
| 2014/0272836 A1 | 9/2014 | Becker |
| 2014/0272837 A1 | 9/2014 | Becker |
| 2014/0272838 A1 | 9/2014 | Becker |
| 2014/0346158 A1 | 11/2014 | Matthews |
| 2015/0056585 A1 | 2/2015 | Boulware et al. |
| 2015/0056586 A1 | 2/2015 | Penrod |
| 2015/0072323 A1 | 3/2015 | Postlethwaite |
| 2015/0125836 A1 | 5/2015 | Daniel |
| 2015/0194073 A1 | 7/2015 | Becker et al. |
| 2015/0235565 A1 | 8/2015 | Postlethwaite |
| 2015/0248845 A1 | 9/2015 | Postlethwaite |
| 2016/0093233 A1 | 3/2016 | Boulware |
| 2016/0203734 A1 | 7/2016 | Boulware |
| 2016/0203735 A1 | 7/2016 | Boulware |
| 2016/0343268 A1 | 11/2016 | Postlethwaite |

FOREIGN PATENT DOCUMENTS

| | | |
|---|---|---|
| CN | 201083660 | 7/2008 |
| CN | 201149744 | 11/2008 |

(56) References Cited

FOREIGN PATENT DOCUMENTS

| | | |
|---|---|---|
| CN | 101406978 | 4/2009 |
| CN | 101419755 | 4/2009 |
| CN | 201229711 | 4/2009 |
| CN | 101571887 | 11/2009 |
| CN | 101587659 | 11/2009 |
| CN | 102083580 | 6/2011 |
| CN | 102202836 | 9/2011 |
| CN | 202053009 | 11/2011 |
| CN | 203503228 | 3/2014 |
| CN | 103871279 | 6/2014 |
| DE | 2833638 | 2/1980 |
| DE | 3046634 | 1/1984 |
| DE | 3244307 | 5/1984 |
| DE | 3522581 | 1/1987 |
| DE | 4037879 | 6/1991 |
| DE | 19615069 | 10/1997 |
| DE | 19739720 | 10/1998 |
| DE | 19834205 | 2/2000 |
| DE | 20009543 | 8/2001 |
| DE | 102005047204 | 4/2007 |
| DE | 102006048165 | 1/2008 |
| DE | 102010038902 | 2/2012 |
| EP | 0008527 | 3/1980 |
| EP | 108599 | 5/1984 |
| EP | 127299 | 12/1984 |
| EP | 145891 | 6/1985 |
| EP | 319623 | 10/1990 |
| EP | 852986 | 7/1998 |
| EP | 1527852 | 5/2005 |
| EP | 1905533 | 4/2008 |
| ES | 2274736 | 5/2007 |
| FR | 1456780 | 3/1965 |
| FR | 2827066 | 1/2003 |
| FR | 2926660 | 7/2009 |
| GB | 1455972 | 11/1976 |
| GB | 1511608 | 5/1978 |
| GB | 2254172 | 9/1992 |
| GB | 2435838 | 9/2007 |
| GB | 2454232 | 5/2009 |
| JP | 02-224877 | 9/1990 |
| JP | 05-329645 | 12/1993 |
| JP | 07-047471 | 2/1995 |
| JP | 07-232270 | 9/1995 |
| JP | 08-505091 | 4/1996 |
| JP | 08-150476 | 6/1996 |
| JP | 08-132274 | 5/1998 |
| JP | 2000-167666 | 6/2000 |
| JP | 2001-071140 | 3/2001 |
| JP | 2002278670 | 9/2002 |
| JP | 2003-200372 | 7/2003 |
| JP | 2003-326362 | 11/2003 |
| JP | 2004025270 | 1/2004 |
| JP | 2006006604 | 1/2006 |
| JP | 2006-281270 | 10/2006 |
| JP | 2007290025 | 11/2007 |
| JP | 2009500178 | 1/2009 |
| JP | 2009160636 | 7/2009 |
| JP | 2012024867 | 2/2012 |
| KR | 20090010693 | 1/2009 |
| RU | 527045 | 7/1995 |
| RU | 2317183 | 2/2008 |
| RU | 2008108601 | 11/2009 |
| SU | 10388963 | 8/1983 |
| WO | 98/45078 | 10/1998 |
| WO | 01/12376 | 2/2001 |
| WO | 01/43910 | 6/2001 |
| WO | 01/58400 | 8/2001 |
| WO | 2004/029549 | 4/2004 |
| WO | 2005/102230 | 11/2005 |
| WO | 2005/110658 | 11/2005 |
| WO | 2006/034571 | 4/2006 |
| WO | 2007/039278 | 4/2007 |
| WO | 2009/060231 | 5/2009 |
| WO | 2009/120921 | 10/2009 |
| WO | 2009/149740 | 12/2009 |
| WO | 2010/000003 | 1/2010 |
| WO | 2010/044982 | 4/2010 |
| WO | 2010/091493 | 8/2010 |
| WO | 2011045654 | 4/2011 |
| WO | 2011/058433 | 5/2011 |
| WO | 2011/059502 | 5/2011 |
| WO | 2011/067447 | 6/2011 |
| WO | 2011/097035 | 8/2011 |
| WO | 2012/016851 | 2/2012 |
| WO | 2012/082105 | 6/2012 |
| WO | 2012/143327 | 10/2012 |
| WO | 2013/014202 | 1/2013 |
| WO | 2013/061518 A1 | 5/2013 |
| WO | 2013/114189 | 8/2013 |
| WO | 2013/119749 | 8/2013 |
| WO | 2013/175079 | 11/2013 |
| WO | 2013/186413 | 12/2013 |
| WO | 2014/007830 | 1/2014 |
| WO | 2014/019045 | 2/2014 |
| WO | 2014/020386 | 2/2014 |
| WO | 2014/140720 | 9/2014 |
| WO | 2014/184710 | 11/2014 |

OTHER PUBLICATIONS

International Search Report and Written Opinion from PCT/IB10/02913 dated Apr. 19, 2011.
International Search Report and Written Opinion from PCT/IB2014/002346 dated Feb. 24, 2015.
International Search Report and Written Opinion from PCT/IB2015/000161 dated Jun. 8, 2015.
International Search Report and Written Opinion from PCT/IB2015/000257 dated Jul. 3, 2015.
Notice of Allowance from U.S. Appl. No. 13/543,240 dated Jun. 3, 2015.
16th International Ship and Offshore Structures Congress : Aug. 20-25, 2006; Southhampton, U.K. vol. 2 Specialist Committee V.3 Fabrication Technology Committee Mandate: T. Borzecki, G. Bruce, Y.S. Han, M. Heinermann, A. Imakita, L. Josefson, W. Nie, D. Olsen, F. Roland and Y. Takeda. Naval Ship Design, ABS Papers 2006.
M. Abbas, F. Waeckel, Code Aster (Software) EDF (France), 29 pages, Oct. 2001.
Abbas, M., et al.; Code_Aster; Introduction to Code_Aster; User Manual; Booklet U1.0-: Introduction to Code_Aster; Document: U1.02.00; Version 7.4; Jul. 22, 2005.
Abid, et al., "Numerical Simulation to study the effect of tack welds and root gap on welding deformations and residual stresses of a pipe flange joint" Intl. J. of Pressure Vessels and Piping, 82, pp. 860-871 (2005).
M. Abida and M. Siddique, Numerical simulation to study the effect of tack welds and root gap on welding deformations and residual stresses of a pipe-flange joint, Faculty of Mechanical Engineering, GIK Institute of Engineering Sciences and Technology, Topi, NWFP, Pakistan, 12 pages, Available on-line Aug. 25, 2005.
Bjorn G. Agren; Sensor Integration for Robotic Arc Welding; 1995; vol. 5604C of Dissertations Abstracts International p. 1123; Dissertation Abs Online (Dialog® File 35): © 2012 ProQuest Info& Learning: http://dialogweb.com/cgi/dwclient?req=1331233317524; one (1) page; printed Mar. 8, 2012.
Aidun et al., "Penetration in Spot GTA Welds during Centrifugation," Journal of Materials Engineering and Performance vol. 7(5) Oct. 1998—597-600.
ANSI/A WS D 10.11 MID 10. 11 :2007 Guide for Root Pass Welding of Pipe without Backing Edition: 3rd American Welding Society / Oct. 13, 2006 /36 pages ISBN: 0871716445, 6 pages.
Antonelli, et al., "A Semi-Automated Welding Station Exploiting Human-robot Interaction", Dept. of Production Systems and Economics, pp. 249-260, 2011.
Arc+ simulator; 2 pgs., http://www.123arc.com/en/depliant_ang.pdf; 2000.
Asciencetutor.com, A division of Advanced Science and Automation Corp., VWL (Virtual Welding Lab), 2 pages, 2007.

(56) References Cited

OTHER PUBLICATIONS

ASME Definitions, Consumables, Welding Positions, dated Mar. 19, 2001. See http://www.gowelding.com/wp/asme4.htm.
B. Virtual Reality Welder Trainer, Session 5, joining Technologies for Naval Applications, earliest date Jul. 14, 2006 (Nancy Porter of EWI).
Balijepalli, A. and Kesavadas, "A Haptic Based Virtual Grinding Tool", Haptic Interfaces for Virtual Environment and Teleoperator Systems, Haptics 2003, 7-.,Department of Mechanical & Aerospace Engineering, State University of New York at Buffalo, NY.
T. Borzecki, G. Bruce, YS. Han, et al., Specialist Committee V.3 Fabrication Technology Committee Mandate, Aug. 20-25, 2006, 49 pages, vol. 2, 16th International Ship and Offshore Structures Congress, Southampton, UK.
Boss (engineering), Wikipedia, 1 page, printed Feb. 6, 2014.
ChemWeb.com, Journal of Materials Engineering and Performance (v.7, #5), 3 pgs., printed Sep. 26, 2012.
S.B. Chen, L. Wu, Q. L. Wang and Y. C. Liu, Self-Learning Fuzzy Neural Networks and Computer Vision for Control of Pulsed GTAW, Welding Research Supplement, pp. 201-209, dated May 1997.
Choquet, Claude; "ARC+: Today's Virtual Reality Solution for Welders" Internet Page, Jan. 1, 2008, 6 pages.
Code Aster (Software) EDF (France), Oct. 2001.
Cooperative Research Program, Virtual Reality Welder Training, Summary Report SR 0512, 4 pages, Jul. 2005.
CS Wave, The Virtual Welding Trainer, 6 pages, 2007.
CS Wave, A Virtual learning tool for welding motion, 10 pages, Mar. 14, 2008.
CS Wave, Product Description, 2 pages, printed Jan. 14, 2015.
Desroches, X.; Code-Aster, Note of use for calculations of welding; Instruction manual U2.03 booklet: Thermomechanical; Document: U2.03.05; Oct. 1, 2003.
D'Huart, Deat, and Lium; Virtual Environment for Training: An Art of Enhancing Reality, 6th International Conference, ITS 20002, Biarritz, France and San Sebastian, Spain, 6 pages, Jun. 2002.
KYT Dotson, Augmented Reality Welding Helmet Prototypes How Awesome the Technology Can Get, Sep. 26, 2012, Retrieved from the Internet: URL:http://siliconangle.com/blog/2012/09/26/augmented-reality-welding-helmet-prototypes-how-awesome-the-technology-can-get/, 1 page, retrieved on Sep. 26, 2014.
Echtler et al., "The Intelligent Welding Gun: Augmented Reality of Experimental Vehicle Construction", Virtual and Augmented Reality Applications in Manufacturing, 17, pp. 1-27, Springer Verlag, 2003.
Edison Welding Institute, E-Weld Predictor, 3 pages, 2008.
Eduwelding+, Weld Into the Future; Online Welding Seminar—A virtual training environment; 123arc.com; 4 pages, 2005.
Eduwelding+, Training Activities with arc+ simulator; Weld Into the Future, Online Welding Simulator—A virtual training environment; 123arc.com; 6 pages, May 2008.
Erden, "Skill Assistance with Robot for Manual Welding", Marie Curie Intra-European Fellowship, Project No. 297857, 3 pgs., printed Apr. 27, 2015.
EWM Virtual Welding Trainer, 2 pages, printed Jan. 14, 2015.
The Fabricator, Virtually Welding, Training in a virtual environment gives welding students a leg up, 4 pages, Mar. 2008.
Fast, K. et al., "Virtual Training for Welding", Mixed and Augmented Reality, 2004, ISMAR 2004, Third IEEE and CM International Symposium on Arlington, VA, Nov. 2-5, 2004.
Fillet weld, Wikipedia, 3 pgs. Printed Feb. 6, 2014.
Fronius, ARS Electronica Linz GMBH, High-speed video technology is applied to research on welding equipment, and the results are visualized in the CAVE, 2 pages, May 18, 1997.
Fronius, Virtual Welding, 8 pages, printed Jan. 14, 2015.
FH Joanneum, Fronius—virtual welding, 2 pages, May 12, 2008.
Fronius, Virtual Welding/The Welder Training of the Future/, 8 page brochure, 2011.
P. Beatriz Garcia-Allende, Jesus Mirapeix, Olga M. Conde, Adolfo Cobo and Jose M. Lopez-Higuera; Defect Detection in Arc-Welding Processes by Means of the Line-to-Continuum Method and Feature Selection; www.mdpi.com/journal/sensors; Sensors 2009, 9, 7753-7770; doi; 10.3390/s91007753.
Juan Vicenete Rosell Gonzales, "RV-Sold: simulator virtual para la formacion de soldadores"; Deformacion Metalica, Es. vol. 34, No. 301, Jan. 1, 2008.
The Goodheart-Wilcox Co., Inc., Weld Joints and Weld Types, Chapter 6, pp. 57-68, date unknown.
M. Ian Graham, Texture Mapping, Carnegie Mellon University Class 15-462 Computer Graphics, Lecture 10, 53 pages, dated Feb. 13, 2003.
Guu and Rokhlin ,Technique for Simultaneous Real-Time Measurements of Weld Pool Surface Geometry and Arc Force, Welding Research Supplement—pp. 473-482, Dec. 1992.
Hills and Steele, Jr.; "Data Parallel Algorithms", Communications of the ACM, Dec. 1986, vol. 29, No. 12, p. 1170.
Hillis et al., "Data Parallel Algorithms", Communications of the ACM, vol. 29, No. 12, Dec. 1986, pp. 1170-1183.
Johannes Hirche, Alexander Ehlert, Stefan Guthe, Michael Doggett, Hardware Accelerated Per-Pixel Displacement Mapping, 8 pages, 2004.
J. Hu and Hi Tsai, Heat and mass transfer in gas metal arc welding. Part 1: the arc, found in ScienceDirect, International Journal of Heat and Mass Transfer 50 (2007), 14 pages, 833-846 Available online on Oct. 24, 2006, http://www.web.mst.edu/~tsai/publications/HU-IJHMT-2007-1-60.pdf.
Aidun, Daryush K., Influence of Simulated High-g on the Weld Size of Al—Li Alloy, Acta Astronautica, vol. 48, No. 2-3, pp. 153-156, 2001.
M. Jonsson, L. Karlsson, and L-E Lindgren, Simulation of Tack Welding Procedures in Butt Joint Welding of Plates Welding Research Supplement, Oct. 1985, pp. 296-302.
Kemppi ProTrainer, product data, 3 pages, printed Jan. 14, 2015.
Konstantinos Nasios (Bsc), Improving Chemical Plant Safety Training Using Virtual Reality, Thesis submitted to the University of Nottingham for the Degree of Doctor of Philosophy, 313 pages, Dec. 2001.
Leap Motion, Inc., product information, copyright 2013, 14 pages.
Learning Labs, Inc., Seabery, Soldamatic Augmented Reality Welding Trainers, 4 pgs., printed Mar. 20, 2014.
Lim et al., "Automatic classification of weld defects using simulated data and MLP neural network", Insight, vol. 49, No. 3, Mar. 2007.
Wade, Human uses of ultrasound: ancient and modern Department of Electrical and Computer Engineering, University of California at Santa Barbara 93106, USA. Ultrasonics (Impact Factor: 1.81). Apr. 2000; 38(1-8):1-5.
Production Monitoring 2 brochure, four (4) pages, The Lincoln Electric Company, May 2009.
The Lincoln Electric Company; CheckPoint Production Monitoring brochure; four (4) pages; http://www.lincolnelectric.com/assets/en_US/products/literature/s232.pdf; Publication S2.32; Issue Date Dec. 2012.
Lincoln Electric, VRTEX Virtual Reality Arc Welding Trainer, 9 pgs. Printed Feb. 2, 2014.
Lincoln Electric, Vrtex 360 Virtual Reality Arc Welding Trainer, 4 pgs., Oct. 2014.
Linholm, E., et al., "NVIDIA Testla: A Unifired Graphics and Computing Architecture", IEEE Computer Society, 2008.
Mahrle et al., "The influence of fluid flow phenomena on the laser beam welding process", Intl. J. of Heat and Fluid Flow, 23, pp. 288-297 (2002).
Steve Mann, Raymond Chun Bing Lo, Kalin Ovtcharov, Shixiang Gu, David Dai, Calvin Ngan, Tao Al, Realtime HDR (High Dynamic Range) Video for Eyetap Wearable Computers, FPGA-Based Seeing Aids, and Glasseyes (Eyetaps), 2012 25th IEEE Canadian Conference on Electrical and Computer Engineering (CCECE),pp. 1-6, 6 pages, Apr. 29, 2012.
J.Y. (Yosh) Mantinband, Hillel Goldenberg, Llan Kleinberger, Paul Kleinberger, Autosteroscopic, field-sequential display with full freedom of movement or Let the display were the shutter -glasses, yosh@3ality.com, (Israel) Ltd., 8 pages, 2002.
Mavrikios D et al, A prototype virtual reality-based demonstrator for immersive and interactive simulation of welding processes, Inter-

(56) References Cited

OTHER PUBLICATIONS national Journal of Computer Integrated manufacturing, Taylor and Francis, Basingstoke, GB, vol. 19, No. 3, Apr. 1, 2006, pp. 294-300.
Mechanisms and Mechanical Devices Sourcebook, Chironis, McGraw Hill, Neil Sclater, 2nd Ed. 1996.
Miller Electric Mfg. Co., "LiveArc Welding Performance Management System", 4 pg. brochure, Dec. 2014.
Miller Electric, Owner's Manual, Live Arc, Welding Performance Management System, Owners's Manual—OM-267357A; 64 pgs., Jul. 2014.
Miller Electric Mgf Co.; MIG Welding System features weld monitoring software; NewsRoom 2010 (Dialog® File 992); © 2011 Dialog. 2010; http://www.dialogweb.com/cgi/dwclient?reg=1331233430487; three (3) pages; printed Mar. 8, 2012.
N. A. Tech., P/NA.3 Process Modeling and Optimization, 11 pages, Jun. 4, 2008.
NSRP ASE, Low-Cost Virtual Reality Welder Training System, 1 Page, 2008.
Nvidia Tesla: A Unified Graphics and Computing Architecture, IEEE Computer Society 0272-1732, Mar.-Apr. 2008.
Terrence O'Brien, "Google's Project Glass gets some more details", Jun. 27, 2012 (Jun. 27, 2012), Retrieved from the Internet: http://www.engadget.com/2012/06/27/googles-project-glass-gets-some-more-details/, 1 page, retrieved on Sep. 26, 2014.
Porter, et al., Virtual Reality Training, Paper No. 2005-P19, 14 pages, 2005.
Porter et al., Virtual Reality Welder Training, 29 pages, dated Jul. 14, 2006.
Porter, Virtual Reality Welder Trainer, Session 5: Joining Technologies for Naval Applications: earliest date Jul. 14, 2006 (http://weayback.archive.org), Edision Welding Institute; J. Allan Cote, General Dynamics Electric Boat; Timothy D. Gifford, VRSim, and Wim Lam, FCS Controls.
Praxair "The RealWeld Trainer System", two page brochure, 2013.
Ratnam and Khalid: "Automatic classification of weld defects using simulated data and an MLP neutral network." Insight vol. 49, No. 3; Mar. 2007.
William T. Reeves, "Particles Systems—A Technique for Modeling a Class of Fuzzy Objects", Computer Graphics 17:3 pp. 359-376, 1983, 17 pages.
Patrick Rodjito, Position tracking and motion prediction using Fuzzy Logic, 81 pages, 2006, Colby College, Honors Theses, Paper 520.
Russell and Norvig, "Artificial Intelligence: A Modern Approach", Prentice-Hall (Copyright 1995).
Schoder, Robert, "Design and Implementation of a Video Sensor for Closed Loop Control of Back Bead Weld Puddle Width," Massachusetts Institute of Technology, Dept. of Mechanical Engineering, May 27, 1983.
Seabury Soluciones, SOLDAMATIC Welding Trainer Simulator, 30 pages, printed Jan. 14, 2015.
SIMFOR / CESOL, "RV-Sold" Welding Simulator, Technical and Functional Features, 20 pages, no date available.
Sim Welder, Train better welders faster, retrieved on Apr. 12, 2010 from: http://www.simwelder.com.
Training in a virtual environment gives welding students a leg up, retrieved on Apr. 12, 2010 from: http://www.thefabricator.com/article/arcwelding/virtually-welding.
Teeravarunyou, et al., "Computer Based Welding Training System", Intl J of Industrial Engineering, 16 (2), pp. 116-125 (2009).
Isaac Brana Veiga, Simulation of a Work Cell in the IGRIP Program, dated 2006, 50 pages.
ViziTech USA, Changing the Way America Learns, retrieved on Mar. 27, 2014 from http://vizitechusa.com/, 2 pages.
Response to Office Action dated Nov. 14, 2014 from U.S. Appl. No. 13/543,240 dated Mar. 13, 2015.
"Numerical Analysis of Metal Transfer in Gas Metal Arc Welding," G. Wang, P.G. Huang, and Y.M. Zhang. Departments of Mechanical and Electrical Engineering. University of Kentucky, Dec. 10, 2001.

Numerical Analysis of Metal Transfer in Gas Metal Arc Welding Under Modified Pulsed Current Conditions, G. Wang, P.G. Huang, and Y.M. Zhang. Metallurgical and Materials Transactions B, vol. 35B, Oct. 2004, pp. 857-866.
Wang et al., Study on welder training by means of haptic guidance and virtual reality for arc welding, 2006 IEEE International Conference on Robotics and Biomimetics, ROBIO 2006 ISBN-10: 1424405718, p. 954-958.
Weld nut, Wikipedia, 2 pgs. Printed Feb. 6, 2014.
Weldplus, Welding Simulator, 2 pages, printed Jan. 14, 2015.
White et al., Virtual welder trainer, 2009 IEEE Virtual Reality Conference, p. 303, 2009.
Chuansong Wu: "Microcomputer-based welder training simulator", Computers in Industry, vol. 20, No. 3, Oct. 1992, pp. 321-325, XP000205597, Elsevier Science Publishers, Amsterdam, NL.
Wuhan Onew Technology Co., Ltd., "Onew Virtual Simulation Expert", 16 pgs., printed Apr. 16, 2015.
Yao et al., 'Development of a Robot System for Pipe Welding'. 2010 International Conference on Measuring Technology and Mechatronics Automation. Retrieved from the Internet: http://ieeexplore.ieee.org/stamp/stamp.jsp?tp=&arnumber=5460347&tag=1; pp. 1109-1112, 4 pages.
EnergynTech Inc.; website printout; http://www.energyntech.com./; Advanced Metals Processing Technology & Flexible Automation for Manufacturing; Virtual Welder; Virtual training system for beginning welders; 2 page; 2014.
EnergynTech Inc.; website printout; http://www.energyntech.com/Zipper.html; Zipper Robot Performing a HiDep Weld; 1 page, 2014.
Terebes; Institute of Automation; University of Bremen; Project Motivation Problems Using Traditional Welding Masks; 2 page; 2015.
WeldWatch Software/Visible Welding; website printout; http://visiblewelding.com/weldwatch-software/4 pages; 2015.
Products/Visible Welding; Weldwatch Video Monitoring System; website prinout http://visiblewelding.com/products; 4 pages; 2015.
NSRP—Virtual Welding—A Low Cost Virtual Reality Welder Training System—Phase II—Final Report; Feb. 29, 2012; Kenneth Fast, Jerry Jones, Valerie Rhoades; 53 pages.
Corrected Notice of Allowance from U.S. Appl. No. 12/966,570 dated Feb. 23, 2015.
Office Action from U.S. Appl. No. 14/444,173 dated Mar. 18, 2015.
Response to Office Action dated Mar. 18, 2015 from U.S. Appl. No. 14/444,173 dated Jun. 11, 2015.
Notice of Allowance from U.S. Appl. No. 14/444,173 dated Jun. 24, 2015.
International Search Report and Written Opinion from PCT/US10/60129 dated Feb. 10, 2011.
International Search Report and Written Opinion fro PCT/US12/45776 dated Oct. 1, 2012.
Office action from U.S. Appl. No. 12/499,687 dated Oct. 16, 2012.
Response from U.S. Appl. No. 12/499,687 dated Apr. 10, 2013.
Office action from U.S. Appl. No. 12/499,687 dated Jun. 26, 2013.
Response from U.S. Appl. No. 12/499,687 dated Nov. 25, 2013.
Office action from U.S. Appl. No. 12/499,687 dated Mar. 6, 2014.
Response from U.S. Appl. No. 12/499,687 dated Sep. 5, 2014.
Office action from U.S. Appl. No. 12/499,687 dated Nov. 6, 2014.
Office action from U.S. Appl. No. 12/966,570 dated May 8, 2013.
Response from U.S. Appl. No. 12/966,570 dated Oct. 8, 2013.
Notice of Allowance from U.S. Appl. No. 12/966,570 dated Apr. 29, 2014.
Office action from U.S. Appl. No. 13/543,240 dated Nov. 14, 2014.
Notice of Allowance from U.S. Appl. No. 13/543,240 dated Sep. 3, 2015.
International Search Report and Written Opinion from PCT/IB2015/000777 dated Sep. 21, 2015.
Office Action from Chinese Application No. 201480025614.3 dated Nov. 28, 2016.
International Search Report and Written Opinion from PCT/IB2015/001711 dated Jan. 4, 2016.
Narayan et al., "Computer Aided Design and Manufacturing," pp. 3-4, 14-15, 17-18, 92-95, and 99-100, Dec. 31, 2008.
International Preliminary Report on Patentability from PCT/IB2014/001796 dated Mar. 15, 2016.

(56) References Cited

OTHER PUBLICATIONS

Office action from U.S. Appl. No. 15/077,481 dated May 23, 2016.
Response from U.S. Appl. No. 15/077,481 dated Jun. 23, 2016.
Office Action from Chinese Application No. 201280075678.5 dated Jul. 5, 2016.
Notice of Allowance from U.S. Appl. No. 15/077,481 dated Aug. 10, 2016.
Office Action from Chinese Application No. 201480027306.4 dated Aug. 3, 2016.
Office Action from Chinese Application No. 201380017661.9 dated Aug. 22, 2016.
International Preliminary Report on Patentability from PCT/IB2015/000161 dated Aug. 25, 2016.
International Preliminary Report on Patentability from PCT/IB2015/000257 dated Sep. 15, 2016.
Office Action from Chinese Application No. 201480025359.2 dated Sep. 26, 2016.
Office Action from U.S. Appl. No. 14/190,812 dated Nov. 9, 2016.
International Search Report and Written Opinion from PCT/IB2015/000814 dated Nov. 5, 2015.
Adams et al., "Adaptively Sampled Particle Fluids," ACM Transactions on Graphics, vol. 26, No. 3, Article 48, Jul. 2007, pp. 48.1-48.7.
Bargteil et al., "A Texture Synthesis Method for Liquid Animations," Eurographics/ ACM SIGGRAPH Symposium on Computer Animation, 2006, pp. 345-351.
Bargteil et al., "A Semi-Lagrangian Contouring Method for Fluid Simulation," ACM Transactions on Graphics, vol. 25, No. 1, Jan. 2006, pp. 19-38.
Chentanez et al., "Liquid Simulation on Lattice-Based Tetrahedral Meshes," Eurographics/ACM SIGGRAPH Symposium on Computer Animation, 2007, 10 pages.
Chentanez et al., "Simultaneous Coupling of Fluids and Deformable Bodies," Eurographics/ ACM SIGGRAPH Symposium on Computer Animation, 2006, pp. 83-89.
Clausen et al., "Simulating Liquids and Solid-Liquid Interactions with Lagrangian Meshes," ACM Transactions on Graphics, vol. 32, No. 2, Article 17, Apr. 2013, pp. 17.1-17.15.
Feldman et al., "Animating Suspended Particle Explosions," Computer Graphics Proceedings, Annual Conference Series, Jul. 27-31, 2003, pp. 1-8.
Feldman et al., "Fluids in Deforming Meshes," Eurographics/ACM SIGGRAPH Symposium on Computer Animation, 2005, pp. 255-259.
Foster et al., "Practical Animation of Liquids," ACM SIGGRAPH, Aug. 12-17, 2001, Los Angeles, CA, pp. 23-30.
Foster et al., "Realistic Animation of Liquids," Graphical Models and Image Processing, vol. 58, No. 5, Sep. 1996, pp. 471-483.
Goktekin et al., "A Method for Animating Viscoelastic Fluids," Computer Graphics Proceedings, Annual Conference Series, Aug. 8-12, 2004, pp. 1-6.
Holmberg et al., "Efficient Modeling and Rendering of Turbulent Water over Natural Terrain," Proceedings of the 2nd International Conference on Computer Graphics and Interactive Techniques in Australasia and South East Asia, Singapore, Jun. 15-18, 2004, pp. 15-22.
Irving et al., "Efficient Simulation of Large Bodies of Water by Coupling Two and Three Dimensional Techniques," ACM Transactions on Graphics (TOG), vol. 25, Issue 3, Jul. 2006, pp. 805-811.
Kass et al., "Rapid, Stable Fluid Dynamics for Computer Graphics," Computer Graphics, vol. 24, No. 4, Aug. 1990, pp. 49-57.
Klinger et al., "Fluid Animation with Dynamic Meshes," Computer Graphics Proceedings, Annual Conference Series, Jul. 30-Aug. 3, 2006, pp. 820-825.
Muller et al., "Particle-Based Fluid Simulation for Interactive Applications," Eurographics/SIGGRAPH Symposium on computer Animation (2003), pp. 154-159 and 372.
O'Brien et al., "Dynamic Simulation of Splashing Fluids," Proceedings of Computer Animation, Apr. 19-21, 1995, Geneva, Switzerland, pp. 198-205.
Premoze et al., "Particle-Based Simulation of Fluids," EUROGRAPHICS, vol. 22, No. 3, 2003, 10 pages.
Rasmussen et al., "Directable Photorealistic Liquids," Eurographics/ACM SIGGRAPH Symposium on Computer Animation, 2004, pp. 193-202.
Stam, "Stable Fluids," SIGGRAPH 99 Conference Proceedings, Annual Conference Series, Aug. 1999, pp. 121-128.
Thurey et al., "Real-time Breaking Waves for Shallow Water Simulations," Proceedings of the Pacific Conference on Computer Graphics and Applications, Maui, HI Oct. 29-Nov. 2, 2007, 8 pages.
Grahn et al., "Interactive Simulation of Contrast Fluid using Smoothed Particle Hydrodynamics," Jan. 1, 2008, Masters Thesis in Computing Science, Umea University, Department of Computing Science, Umea Sweden, 69 pages.
Vesterlund et al., "Simulation and Rendering of a Viscous Fluid using Smoothed Particle Hydrodynamics," Dec. 3, 2004, Master's Thesis in Computing Science, Umea University, Department of Computing Science, Umea Sweden; 46 pages.
Muller et al., "Point Based Animation of Elastic, Plastic and Melting Objects," Eurographics/ACM SIGGRAPH Symposium on Computer Animation (2004), 11 pages.
Nealen, "Point-Based Animation of Elastic, Plastic, and Melting Objects," CG topics, Feb. 2005, 2 pages.
Tonnesen, "Modeling Liquids and Solids using Thermal Particles," Proceedings of Graphics Interface 1991, pp. 255-262, Calgary, Alberta, 1991.
Cuda, "Programming Guide Version 1.1," Nov. 29, 2007, 143 pages.
Websters II new college dictionary, 3rd ed., Houghton Mifflin Co., copyright 2005, Boston, MA, p. 1271, definition of Wake, 3 pages.
Da Dalto et al., "CS Wave: Learning welding motion in a virtual environment," published in Proceedings of the IIW International Conference, Jul. 10-11, 2008, 19 pages.
CS Wave-Manual, "Virtual Welding Workbench User Manual 3.0," 2007, 25 pages.
Choquet, "ARC+®: Today's Virtual Reality Solution for Welders," published in Proceedings of the IIW International Conference, Jul. 10-11, 2008, 19 pages.
Welding Handbook, Welding Science & Technology, American Welding Society, Ninth Ed., Copyright 2001, Appendix A, "Terms and Definitions," 54 pages.
"Virtual Welding: A Low Cost Virtual Reality Welder Training System," NSRP RA 07-01—BRP Oral Review Meeting in Charleston, SC at ATI, Mar. 2008, 6 pages.
Aiteanu, "Virtual and Augmented Reality Supervisor for a New Welding Helmet," Dissertation Nov. 15, 2005, 154 pages.
Screen Shot of CS Wave Exercise 135.FWPG Root Pass Level 1 https://web.archive.org/web/20081128081858/http:/wave.c-s.fr/images/english/snap_evolution2.Jpg, 1 page.
Screen Shot of CS Wave Control Centre V3.0.0 https://web.archive.org/web/20081128081915/http:/wave.c-s.fr/images/english/snap_evolution4.jpg, 1 page.
Screen Shot of CS Wave Control Centre V3.0.0 https://web.archive.org/web/20081128081817/http:/wave.c-s.fr/images/english/snap_evolution6.jpg, 1 page.
Da Dalto et al. "CS Wave a Virtual learning tool for the welding motion," Mar. 14, 2008, 10 pages.
Nordruch et al., "Visual Online Monitoring of PGMAW Without a Lighting Unit," Jan. 2005, 14 pages.
Tamasi, "The Evolution of Computer Graphics," NVIDIA, 2008, 36 pages.
VRSim Powering Virtual Reality, www.lincolnelectric.com/en-us/eguipment/lraining-eguipment/Pages/powered-by-'rsim.aspx, 2016, 1 page.
Hillers et al., "Direct welding arc observation without harsh flicker," 8 pages, allegedly FABTECH International and AWS welding show, 2007.
Declaration of Dr. Michael Zyda, May 3, 2016, exhibit to IPR 2016-00905, 72 pages.
Declaration of Edward Bohnart, Apr. 27, 2016, exhibit to IPR 2016-00905, 23 pages.
Declaration of Dr. Michael Zyda, May 3, 2016, exhibit to IPR 2016-00904, 76 pages.

(56) References Cited

OTHER PUBLICATIONS

Declaration of Edward Bohnart, Apr. 27, 2016, exhibit to IPR 2016-00904, 22 pages.
Declaration of Axel Graeser, Apr. 17, 2016, exhibit to IPR 2016-00840, 88 pages.
Arc+—Archived Press Release from WayBack Machine from Jan. 31, 2008-Apr. 22, 2013, https://web.3rchive.org/web/20121006041803/http://www.123certification.com/en/article_press/index.htm, downloaded on Jan. 21, 2016, 3 pages.
Tschirner et al., "Virtual and Augmented Reality for Quality Improvement of Manual Welds," National Institute of Standards and Technology, Jan. 2002, Publication 973, 24 pages.
Wang et al., "Impingement of Filler Droplets and Weld Pool During Gas Metal Arc Welding Process," International Journal of Heat and Mass Transfer, Sep. 1999, 14 pages.
Jeffus, "Welding Principles and Applications," Sixth Edition, 2008, 10 pages.
Renwick et al., "Experimental Investigation of GTA Weld Pool Oscillations," Welding Research—Supplement to the Welding Journal, Feb. 1983, 7 pages.
Phar, "GPU Gems 2 Programming Techniques for High-Performance Graphics and General-Purpose Computation," 2005, 12 pages.
Notice of Allowance from U.S. Appl. No. 15/077,481 dated Feb. 3, 2017.
Office Action from U.S. Appl. No. 14/526,914 dated Feb. 3, 2017.
International Preliminary Report on Patentability from PCT/IB2015/000158 dated Jan. 26, 2017.
Office Action from U.S. Appl. No. 14/190,812 dated Feb. 23, 2017.
Office Action from U.S. Appl. No. 14/552,739 dated Feb. 17, 2017.
Office Action from U.S. Appl. No. 14/615,637 dated Apr. 27, 2017.
Office Action from Chinese Application No. 201480025359.2 dated Feb. 28, 2017.
Office Action from Chinese Application No. 201380076368.X dated Mar. 1, 2017.
Yaoming, "Applications of Microcomputer in Robot Technology," Scientific and Technical Documentation Press, Sep. 1987, pp. 360-365.
Exhibit B from Declaration of Morgan Lincoln in *Lincoln Electric Co. et al. v. Seabery Soluciones, S.L. et al.*, Case No. 1:15-cv-01575-DCN, dated Dec. 20, 2016, 5 pages.
International Search Report and Written Opinion from PCT/IB2015/000777 dated Dec. 15, 2016.
International Search Report and Written Opinion from PCT/IB2015/000814 dated Dec. 15, 2016.
"High Performance Computer Architectures: A Historical Perspective," downloaded May 5, 2016, http://homepages.inf.ed.ac.uk/cgi/mi/comparch. pl?Paru/perf.html,Paru/perf-f.html,Paru/menu-76.html, 3 pages.
Aiteanu et al., "Generation and Rendering of a Virtual Welding Seam in an Augmented Reality Training Environment," Proceedings of the Sixth IASTED International Conference on Visualization, Imaging and Image Processing, Aug. 28-30, 2006, 8 pages, allegedly Palma de Mallorca, Spain. Ed. J.J. Villaneuva. ACTA Press.
Tschirner et al., "A Concept for the Application of Augmented Reality in Manual Gas Metal Arc Welding," Proceedings of the International Symposium on Mixed and Augmented Reality; 2 pages; 2002.
Penrod, "New Welder Training Tools," EWI PowerPoint presentation, 16 pages, allegedly 2008.
Fite-Georgel, "Is there a Reality in Industrial Augmented Reality?" 10th IEEE International Symposium on Mixed and Augmented Reality (ISMAR), 10 pages, allegedly 2011.
Hillers et al., "Real time Arc-Welding Video Observation System," 62nd International Conference of IIW, Jul. 12-17, 2009, 5 pages, allegedly Singapore 2009.
Advance Program of American Welding Society Programs and Events, Nov. 11-14, 2007, 31 pages, Chicago.

Terebes, examples from http://www.terebes.uni-bremen.de., 6 pages.
Sandor et al., "PAARTI: Development of an Intelligent Welding Gun for BMW," PIA2003, 7 pages, Tokyo, 2003.
Arvika Forum Vorstellung Projekt PAARI, BMW Group Virtual Reality Center, 4 pages, Nuernberg, 2003.
Sandor et al., "Lessons Learned in Designing Ubiquitous Augmented Reality User Interfaces," 21 pages, allegedly from Emerging Technologies of Augmented Reality: Interfaces Eds. Haller, M.; Billinghurst, M.; Thomas, B. Idea Group Inc., 2006.
Impact Welding: examples from current and archived website, trade shows, etc. See, e.g., http://www.impactwelding.com, 53 pages.
http://www.nsrp.org/6-Presentations/WDVirtual_Welder.pdf (Virtual Reality Welder Training, Project No. SI051, Navy ManTech Program, Project Review for ShipTech 2005), 22 pages, Biloxi, MS.
https://app.aws_org/w/r/www/wj/2005/031WJ_2005_03.pdf (AWS Welding Journal, Mar. 2005 (see, e.g., p. 54))., 114 pages.
https://app.aws.org/conferences/defense/live index.html (AWS Welding in the Defense Industry conference schedule, 2004), 12 pages.
https://app.aws.org/wj/2004/04/052/njc (AWS Virtual Reality Program to Train Welders for Shipbuilding, workshop information, 2004), 7 pages.
https://app.aws.org/wj/2007/11WJ200711.pdf (AWS Welding Journal, Nov. 2007), 240 pages.
American Welding Society, "Vision for Welding Industry," 41 pages.
Energetics, Inc. "Welding Technology Roadmap," Sep. 2000, 38 pages.
Aiteanu et al., "Computer-Aided Manual Welding Using an Augmented Reality Supervisor," Sheet Metal Welding conference XII, Livonia, MI, May 9-12, 2006, 14 pages.
Hillers et al., "Augmented Reality—Helmet for the Manual Welding Process," Institute of Automation, University of Bremen, Germany, 21 pages.
Aiteanu et al., "A Step Forward in Manual Welding: Demonstration of Augmented Reality Helmet" Institute of Automation, University of Bremen, Germany, Proceedings of the Second IEEE and ACM International Symposium on Mixed and Augmented Reality; 2003, 2 pages.
ArcSentry, "Weld Quality Monitoring System," Native American Technologies, allegedly 2002, 5 pages.
P/NA.3, "Process Modelling and Optimization," Native American Technologies, allegedly 2002, 5 pages.
Hillers et al., "TEREBES: Welding Helmet with AR Capabilities," Institute of Automatic University Bremen; Institute of Industrial Engineering and Ergonomics, 10 pages, allegedly 2004.
Sheet Metal Welding Conference XII, American Welding Society Detroit Section, May 2006, 11 pages.
Fast et al., "Virtual Training for Welding," Proceedings of the Third IEEE and ACM International Symposium on Mixed and Augmented Reality (ISMAR 2004), 2 pages.
Amended Answer to Complaint with Exhibit A filed by Seabery North America Inc. in *Lincoln Electric Co. et al. v. Seabery Soluciones, S.L. et al.*, Case No. 1:15-cv-01575-DCN, doc. No. 44, filed Mar. 1, 2016, in the U.S. District court for the Northern District of Ohio, 19 pages.
Amended Answer to Complaint with Exhibit A filed by Seabery Soluciones SL in *Lincoln Electric Co. et al. v. Seabery Soluciones, S.L. et al.*, Case No. 1:15-cv-01575-DCN, doc. No. 45, filed Mar. 1, 2016, in the U.S. District Court for the Northern District of Ohio, 19 pages.
Reply to Amended Answer to Complaint for Patent Infringement filed by Lincoln Electric Co., Lincoln Global, Inc. in *Lincoln Electric Co. et al. v. Seabery Soluciones, S.L. et al.*, Case No. 1:15-cv-01575-DCN, doc. No. 46, filed Mar. 22, 2016, in the U.S. District Court for the Northern District of Ohio, 5 pages.
Answer for Patent Infringement filed by Lincoln Electric Company, Lincoln Global, Inc. in *Lincoln Electric Co. et al. v. Seabery Soluciones, S.L. et al.*, Case No. 1:15-cv-01575-DCN, doc. No. 47, filed Mar. 22, 2016, in the U.S. District Court for the Northern District of Ohio, 5 pages.

(56) References Cited

OTHER PUBLICATIONS

Petition for Inter Partes Review of U.S. Pat. No. 8,747,116, IPR 2016-00749, Apr. 7, 2016; 70 pages.
Petition for Inter Partes Review of U.S. Patent No. RE45,398, IPR 2016-00840, Apr. 18, 2016, 71 pages.
Petition for Inter Partes Review of U.S. Pat. No. 9,293,056, IPR 2016-00904, May 9, 2016, 91 pages.
Petition for Inter Partes Review of U.S. Pat. No. 9,293,057, IPR 2016-00905, May 9, 2016, 87 pages.
http://www.vrsim.net/history, downloaded Feb. 26, 2016, 10:04:37 pm.
Complaint for Patent Infringement in *Lincoln Electric Co. et al.* v. *Seabery Soluciones, S.L. et al.*, Case No. 1:15-av-01575-DCN, doc. No. 1, filed Aug. 10, 2015, in the U.S. District Court for the Northern District of Ohio, 81 pages.
Kobayashi et al., "Simulator of Manual Metal Arc Welding with Haptic Display," Proc. of the 11th International Conf. on Artificial Reality and Telexistence (ICAT), Dec. 5-7, 2001, pp. 175-178, Tokyo, Japan.
Wahi et al., "Finite-Difference Simulation of a Multi-Pass Pipe Weld," vol. L, paper 3/1, International Conference on Structural Mechanics in Reactor Technology, San Francisco, CA, Aug. 15-19, 1977.
Declaration of Dr. Michael Zyda, May 3, 2016, exhibit to IPR 2016-00749.
Declaration of Edward Bohnert, Apr. 27, 2016, exhibit to IPR 2016-00749.
Swantec corporate web page downloaded Apr. 19, 2016, http://www.swantec.com/technology/numerical-simulation/.
Catalina et al., "Interaction of Porosity with a Planar Solid/Liquid Interface," Metallurgical and Materials Transactions, vol. 35A, May 2004, pp. 1525-1538.
Fletcher Yoder Opinion re RE45398 and U.S. Appl. No. 14/589,317, Sep. 9, 2015, 41 pages.
Kobayashi et al., "Skill Training System of Manual Arc Welding by Means of Face-Shield-Like HMD and Virtual Electrode," Entertainment Computing, vol. 112 of the International Federation for Information Processing (IFIP), Springer Science + Business Media, New York, copyright 2003, pp. 389-396.
G.E. Moore, "No exponential is forever: but Forever can be delayed!," IEEE International Solid-State Circuits conference, 2003, 19 pages.
Office Action from U.S. Appl. No. 14/293,826 dated Dec. 30, 2016.
International Preliminary Report on Patentability from PCT/IB2015/001084 dated Jan. 26, 2017.
Xie et al., "A Real-Time Welding Training System Base on Virtual Reality," Wuhan Onew Technology Co., Lid, IEEE Virtual Reality Conference 2015, Mar. 23-27, Arles France, pp. 309-310.

\* cited by examiner

| CURRICULUM STATUS |
|---|
| ✓ 1    1G Stringer Single Pass - GMAW |
| ✓ 2    1F Fillet Single Pass - GMAW |
| ✓ 3    1F Lap Single Pass - GMAW |
| ✓ 4    1G Butt Single Pass - GMAW |
| ✓ 5    2G Stringer Single Pass - GMAW |
| ○ 6    2F Fillet Single Pass - GMAW |
| 7    2F Lap Single Pass - GMAW |
| 8    2G Butt Single Pass - GMAW |
| 9    3G Stringer Single Pass - GMAW |
| 10    3F Fillet Single Pass - GMAW |
| 11    3F Lap Single Pass - GMAW |
| 12    3G Butt Single Pass - GMAW |

SYSTEM AND METHOD FOR MANUAL WELDER TRAINING

CROSS-REFERENCE TO RELATED APPLICATIONS

This patent application is a continuation-in-part of U.S. patent application Ser. No. 13/543,240 filed on Jul. 6, 2012 and entitled "System for Characterizing Manual Welding Operations", the disclosure of which is incorporated by reference herein in its entirety and made part of the present U.S. utility patent application for all purposes.

BACKGROUND OF THE INVENTION

The described invention relates in general to a system for characterizing manual welding operations, and more specifically to a system for providing useful information to a welding trainee by capturing, processing, and presenting in a viewable format, data generated by the welding trainee in manually executing an actual weld in real time.

The manufacturing industry's desire for efficient and economical welder training has been a well-documented topic over the past decade as the realization of a severe shortage of skilled welders is becoming alarmingly evident in today's factories, shipyards, and construction sites. A rapidly retiring workforce, combined with the slow pace of traditional instructor-based welder training has been the impetus for the development of more effective training technologies. Innovations which allow for the accelerated training of the manual dexterity skills specific to welding, along with the expeditious indoctrination of arc welding fundamentals are becoming a necessity. The characterization and training system disclosed herein addresses this vital need for improved welder training and enables the monitoring of manual welding processes to ensure the processes are within permissible limits necessary to meet industry-wide quality requirements. To date, the majority of welding processes are performed manually, yet the field is lacking practical commercially available tools to track the performance of these manual processes. Thus, there is an ongoing need for an effective system for training welders to properly execute various types of welds under various conditions.

SUMMARY OF THE INVENTION

The following provides a summary of certain exemplary embodiments of the present invention. This summary is not an extensive overview and is not intended to identify key or critical aspects or elements of the present invention or to delineate its scope.

In accordance with one aspect of the present invention, a method for manual welder training is provided. This method includes the steps of providing a welding training apparatus, wherein the training apparatus further includes both hardware and software components, wherein the training apparatus is operative to gather and process data in real time, and wherein the data is derived from an actual training exercise conducted by a welding trainee; selecting training objectives from a predetermined number of predefined objectives; initializing a curriculum for the trainee, wherein the curriculum is based on the selected training objectives; performing at least one training exercise, wherein the training exercise is based on or is a component of the curriculum; providing real-time feedback to the trainee, wherein the real-time feedback is based on the performance of the trainee during the training exercise; evaluating the performance of the trainee based on data gathered and processed during the training exercise; optionally, adapting the curriculum based on the trainee's performance evaluation; and awarding credentials, certifications, or the like to the trainee following successful completion of the curriculum.

Additional features and aspects of the present invention will become apparent to those of ordinary skill in the art upon reading and understanding the following detailed description of the exemplary embodiments. As will be appreciated by the skilled artisan, further embodiments of the invention are possible without departing from the scope and spirit of the invention. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more exemplary embodiments of the invention and, together with the general description given above and detailed description given below, serve to explain the principles of the invention, and wherein:

FIG. 3 is a screenshot of a curriculum sequence of 12 welding procedure specifications, with welding procedure specifications 1-5 complete and welding procedure specification 6 active;

FIG. 4 is a screenshot of an example welding procedure specification for GMAW fillet welds in the horizontal position;

DETAILED DESCRIPTION OF THE INVENTION

Figure 1:
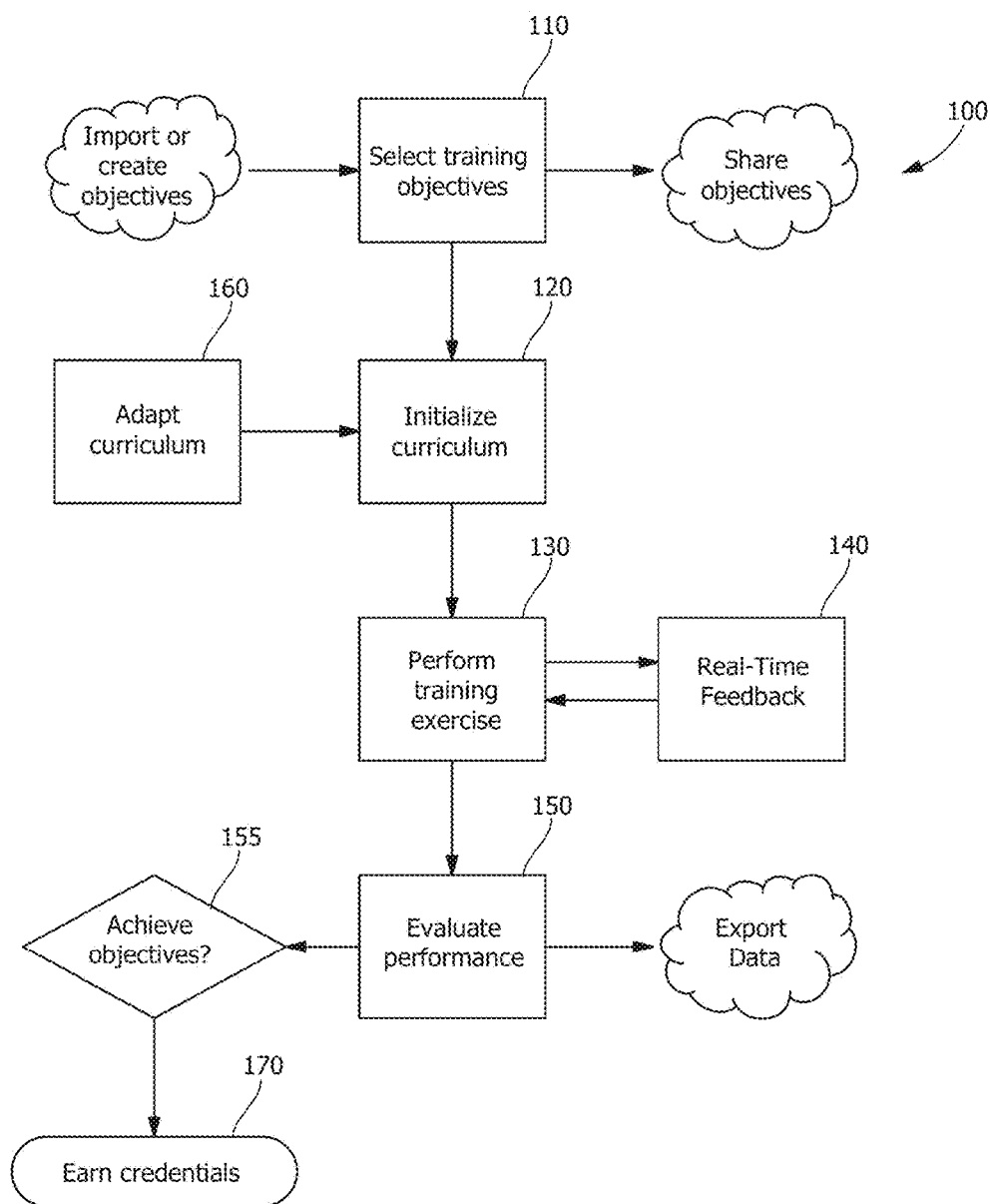
FIG. 1 is a flow chart of the training methodology of an exemplary embodiment of the system and method for manual welder training of the present invention.

Exemplary embodiments of the present invention are now described with reference to the Figures. Reference numerals are used throughout the detailed description to refer to the various elements and structures. In other instances, well-known structures and devices are shown in block diagram form for purposes of simplifying the description. Although the following detailed description contains many specifics for the purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.

In some embodiments, the present invention incorporates and expands upon the technology disclosed in U.S. patent application Ser. No. 13/543,240, which is incorporated by reference herein, in its entirety for all purposes. U.S. patent application Ser. No. 13/543,240 discloses a system for characterizing manual welding operations, and more specifically a system for providing useful information to a welding trainee by capturing, processing, and presenting in a viewable format, data generated by the welding trainee in manually executing an actual weld in real time. More specifically, the system disclosed in U.S. patent application Ser. No. 13/543,240 includes a data generating component; a data capturing component; and a data processing component. The data generating component further includes a fixture, wherein the geometric characteristics of the fixture are predetermined; a workpiece adapted to be mounted on the fixture, wherein the workpiece includes at least one joint to be welded, and wherein the vector extending along the joint to be welded defines an operation path; at least one calibration device, wherein each calibration device further includes at least two point markers integral therewith, and wherein the geometric relationship between the point markers and the operation path is predetermined; and a welding tool, wherein the welding tool is operative to form a weld at the joint to be welded, wherein the welding tool defines a tool point and a tool vector, and wherein the welding tool further includes a target attached to the welding tool, wherein the target further includes a plurality of point markers mounted thereon in a predetermined pattern, and wherein the predetermined pattern of point markers is operative to define a rigid body. The data capturing component further includes an imaging system for capturing images of the point markers. The data processing component is operative to receive information from the data capturing component and then calculate the position and orientation of the operation path relative to the three-dimensional space viewable by the imaging system; the position of the tool point and orientation of the tool vector relative to the rigid body; and the position of the tool point and orientation of the tool vector relative to the operation path. With regard to the system components and operational principles discussed above (i.e., how the data which characterizes the welding operation is obtained), the present invention provides means for taking advantage of the acquired data, whether that be in the welder training realm or the production monitoring realm and provides various methods for utilizing manual welding characterization data to accelerate the process of obtaining predetermined training objectives.

FIG. 1 provides a flow chart that details a system and method in accordance with the present invention for achieving predetermined training objectives, starting with the selection of a specific set of training objectives and ending with the earning of certain welding credentials. Within this system and method 100, a number of novel techniques are including for helping a user achieve the objectives in an effective and efficient manner. Step 110, which is the initial step in the inventive method disclosed herein, includes selecting an individual or set of training objectives. These objectives, which may be associated with industry welder training standards (e.g., American Welding Society (AWS) D1.1), may be tied directly to qualified or customized welding procedure specifications (WPS) or linked to specific levels or measures of weld quality (e.g., bead size, convexity, defect formation, weld bead tie-in, etc.). A virtual curriculum is then generated at step 120 based on the selected training objectives to guide the user through the training progression. This curriculum is initialized at the onset of training, but typically adapts to the user throughout the process. When in use, the core of this method typically includes a recurring sequence of performing training exercises (step 130); with or without real-time feedback assistance (step 140); evaluating performance (step 150); and adapting or modifying the curriculum based on performance (step 160). Training exercises may be defined as manual welding exercises where the user either makes a weld according to the selected curriculum criteria (e.g., welding process, position, joint type, tool manipulation targets, arc parameters, etc.), or mimics the tool manipulation dynamics without the presence of the welding arc. Throughout the training exercise real-time feedback on an array of performance variables can be utilized to keep the user from straying too far from the objectives. At the conclusion of each training exercise an array of performance measurements (based on the training objectives) may be studied to judge or rate progress. The degree of progress or regression may then be utilized to adapt to the user's needs, whether that be an adjustment to move the user forward in the curriculum or backwards in the curriculum for remedial training. Once the final objectives are met at decision point 155, the user 'graduates' at step 170 by earning the desired credentials or badges, obtaining the job, passing the course, etc.

As indicated above, step 110 includes selecting an individual or set of desired training objectives, which may vary based on the end user of the system. Table 1 lists several typical environments for training and the respective objectives.

TABLE 1

Typical Environments and Objectives for Manual Welder Training

| Environment | Example Objective |
| --- | --- |
| High school welding class | Develop the ability to perform a set of welds while maintaining essential variables within an envelope defined by a welding instructor via a set of customized WPSs |
| Trade school welding class | Develop the ability to perform a set of welds while maintaining essential variables within an envelope defined by prequalified WPSs |
| Union training program | Become a certified welder under AWS D1.1 structural code |
| Manufacturer-based qualification | Demonstrate the ability to perform a set of manufacturer-specific welds per a manufacturer-defined quality standard |

Figure 2:
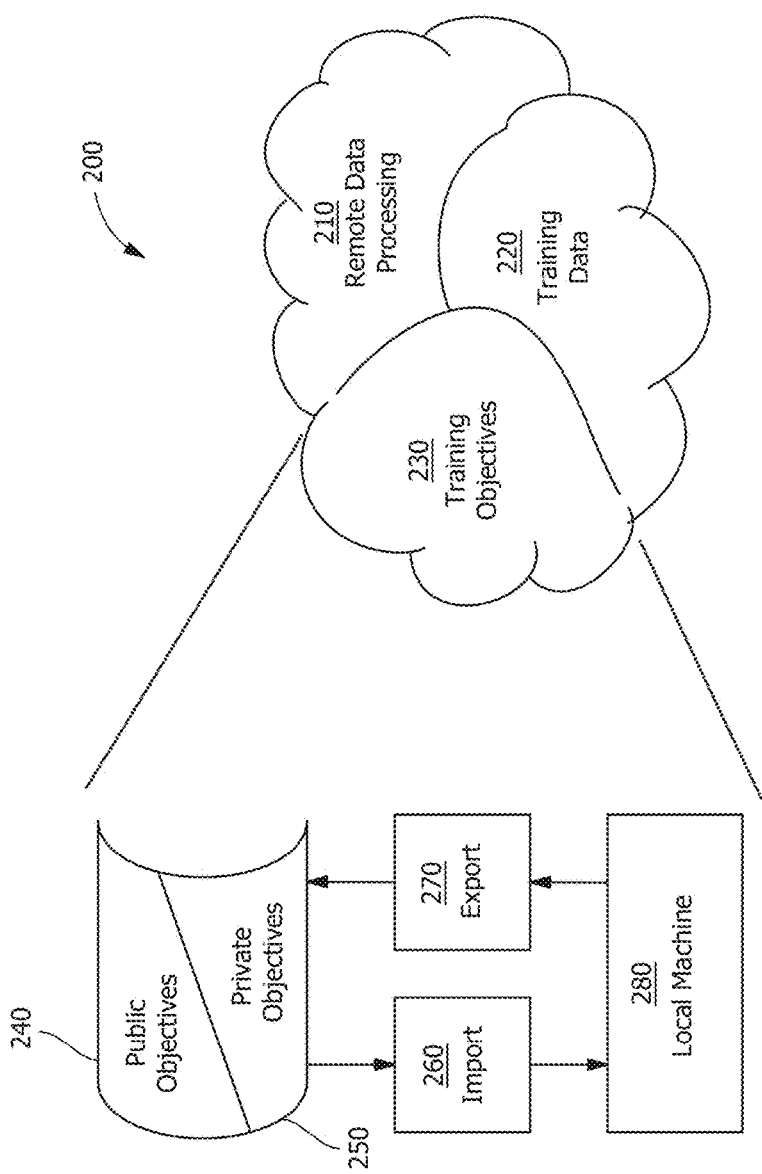
FIG. 2 is a diagram of a cloud-based server with a breakout of training objectives.

A number of steps within the training methodology outlined in FIG. 1 involve some interaction with a cloud-based server or the like. This interaction is necessary in such cases for the selection of a training objective as all objectives are stored on the server whether they are publicly shared or privately managed. FIG. 2 illustrates the data management partitions of the server along with a breakout of training objective specifics. Training objectives can be managed in two different ways; as public objectives, sharable throughout a global community of users, or as private objectives, accessible only by users with rights to the objective. Examples of public objectives are those which may be standardized across an industry. This could be for obtaining a standardized certification, for example. If the user subscribes to a certain industrial sector or organization (e.g. AWS, IIW) the objective may simply be imported. Additionally, custom objectives could be public if the maker of the objective designates them to be public. The server manages the market of standardized or customized training objectives for the global user community, importing and exporting objectives, and tracking metrics for active objectives. Training objectives may also be private and fully customizable for the user. For example, a high school instructor may want to tailor the objectives to fit a time period allowed in a semester, or a manufacturer may want to tailor the objectives around weld types specific to their product. These objectives again may be managed in a secure cloud-based server, and may be imported by users with permission to import. Ultimately, the user either takes advantage of the global community to select a training objective or develops a user-customized objective. In FIG. 2, an exemplary embodiment of data management partitions 200 includes remote data processing component 210; training data component 220; and training objectives component 230 (all of which are cloud-based), which are accessible by and in communication with other aspects of the system to provide public objectives 240 and private objectives 250, which are imported at step 260 or exported at step 270 with regard to local machine 280.

Figure 4:
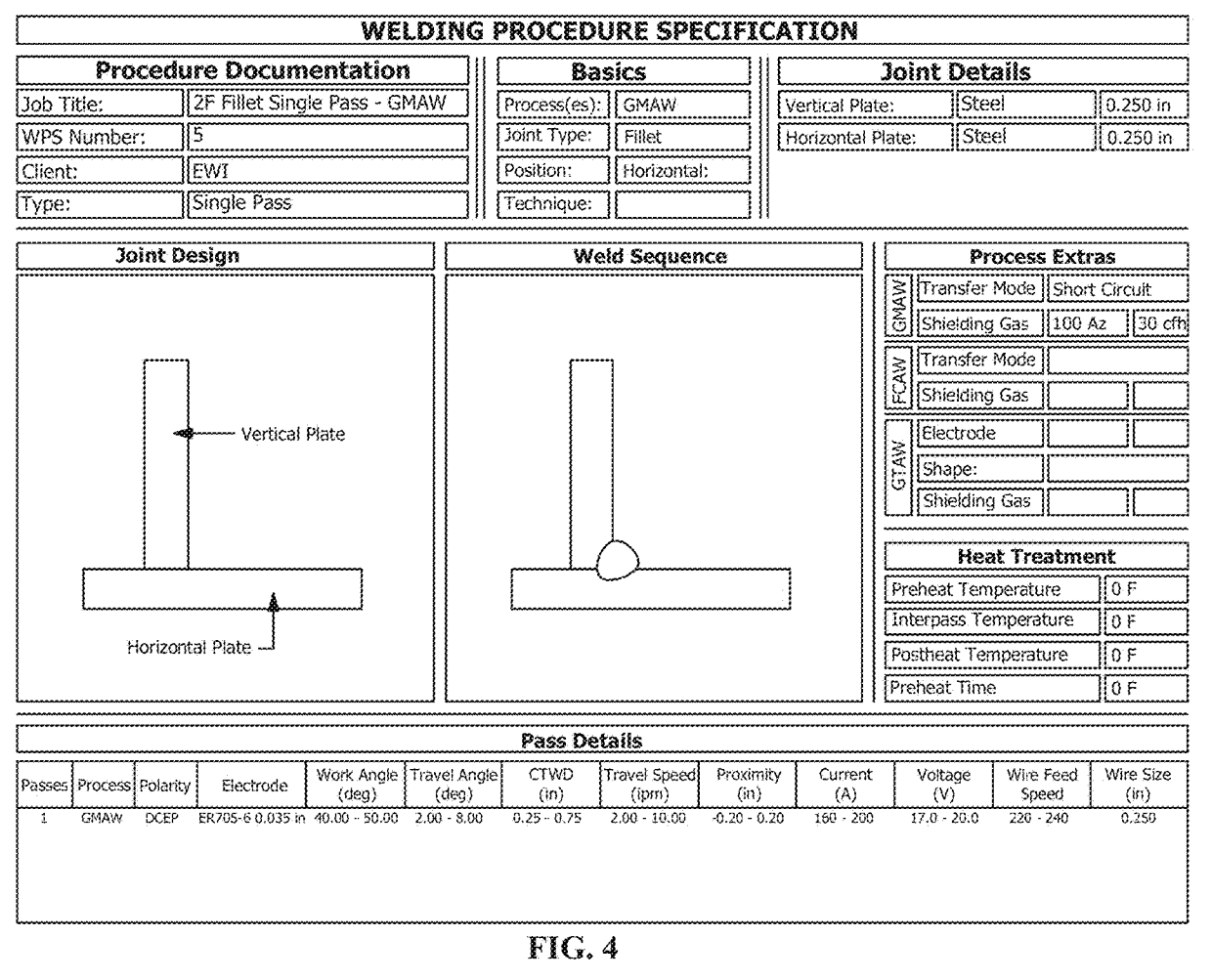

As indicated above, a virtual curriculum is generated at step 120 based on the selected training objectives to guide the user through the training progression. Each selected objective is accompanied by a corresponding curriculum to guide the user through the training process, wherein a curriculum is typically comprised of one or more tasks to complete. Typically these tasks are in the form of welding procedure specifications, meaning that the task is directed toward mastering a specific welding procedure. For example, if the objective is to pass a high school welding course, the curriculum (see FIG. 3) will track progress on mastering all of the welding procedure specifications that are required for that particular course. Each welding procedure specification within the curriculum describes a specific welding procedure in terms of its form variables and execution variables for generating a quality weld. FIG. 4 provides an example welding procedure specification for GMAW fillet welds in the horizontal position and Table 2 lists examples of form variables and Table 3 lists examples of execution variables.

TABLE 2

Examples of Form Variable

| Form Variables | Typical Values |
| --- | --- |
| Process | SMAW, GMAW, FCAW, GTAW |
| Joint Type | Fillet, Lap, Groove |
| Position | Flat, Horizontal, Vertical, Overhead |
| Material | Steel, Aluminum, Titanium |
| Thickness | 0.25, 0.5, 1 [in] |
| Root Gap | 0.03, 0.06, 0.125 [in] |
| Root Landing | 0.03, 0.125, 0.25 [in] |
| Included Angle | 10, 15, 20 [°] |

TABLE 3

Examples of Execution Variables

| Execution Variables | Typical Values |
| --- | --- |
| Polarity | DCEP, DCEN |
| Electrode Type | ER70S-6 |
| Work Angle | 45 ± 5 [°] |
| Travel Angle | 5 ± 5 [°] |

TABLE 3-continued

Examples of Execution Variables

| Execution Variables | Typical Values |
| --- | --- |
| Arc Length | 0.5 ± 0.125 [in] |
| Travel Speed | 10 ± 2 [lpm] |
| Tool Placement | 0.0 ± 0.1 [in] |
| Current | 180 ± 20 [A] |
| Voltage | 22 ± 2 [V] |
| Weld Size | 0.25 ± 0.025 [in] |

The control limits within the welding procedure specification drive the training methodology as the user is measured upon his or her ability to execute the weld within these limits. This aspect of the prevention is explained in greater detail under step 160, where the curriculum is adapted. In addition to welding procedure specification tasks, a curriculum may also include tasks for quizzes and tutorials to integrate classroom tools into the training booth, mechanical testing for certification objectives, and cleaning and joint preparation tasks.

Figure 5:
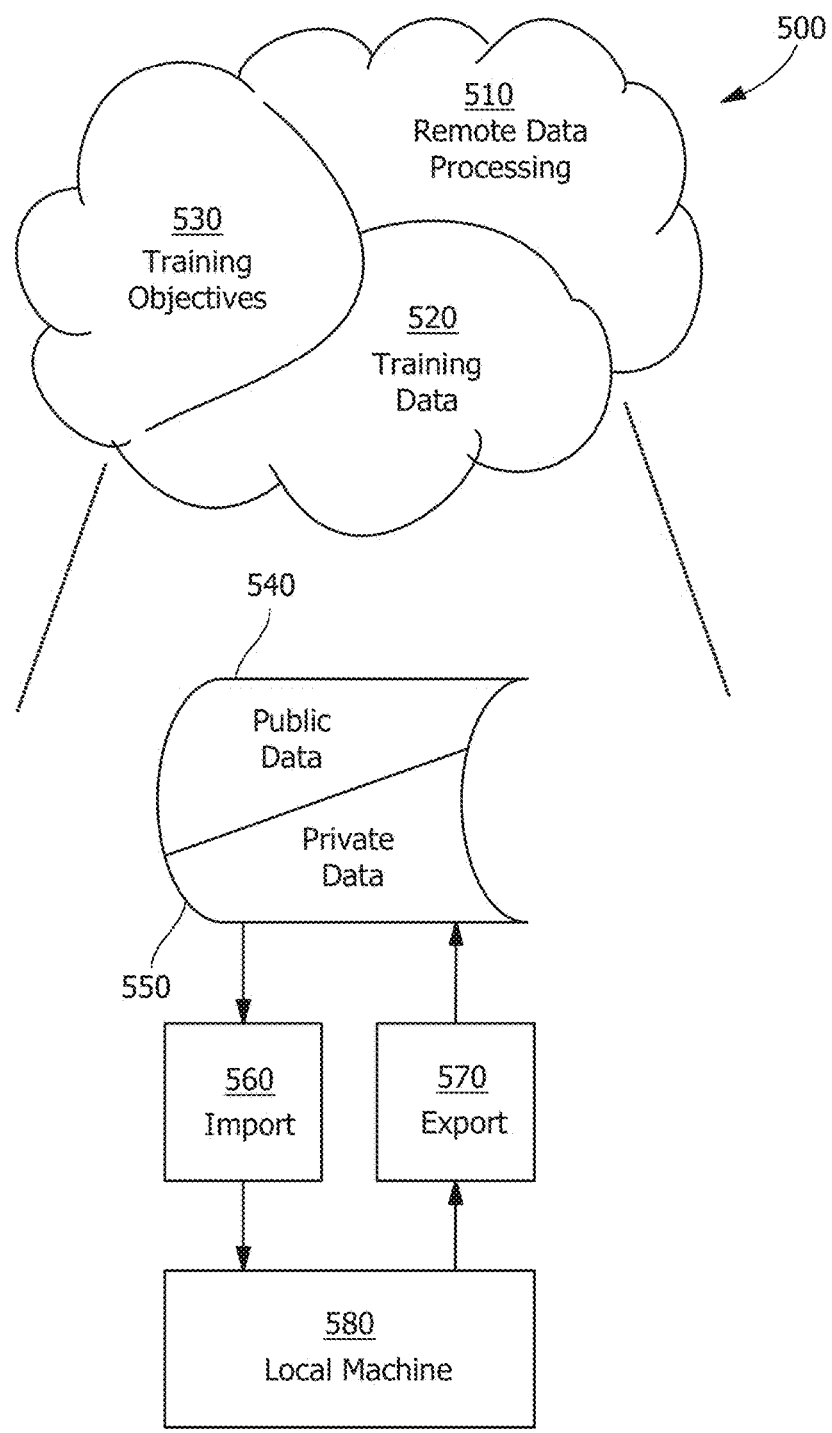
FIG. 5 is a diagram of a cloud-based server with a breakout of training data.

Once the curriculum is initialized the training commences with the initial welding procedure specification under a nominal control limit setting. This begins a recursive process of performing training exercises (step 130); with or without real-time feedback assistance (step 140); evaluating performance (step 150); and adapting or modifying the curriculum based on performance (step 160). Training exercises are defined as the execution of tool manipulation along a welding joint according to the control limits provided in the welding procedure specification. These exercises can be carried out in two different modes, arc-off and arc-on. At an introductory level this exercise is typically performed without the presence of the arc. As increasing aptitude is observed by the system the training exercises are shifted to arc-on welding. The data obtained from each training exercise, like the training objectives, is typically stored in a remote server. If the data needs to be called back into the local system for any reason (e.g., to evaluate performance) it is pulled from the server, and processed and displayed locally. FIG. 5 illustrates an exemplary embodiment of the data storage partition 500 of the cloud-based server, wherein remote data processing 510; training data 520; and training objectives 530 (all of which are cloud-based) which are accessible by and in communication with other aspects of the system to provide public date 540 and private data 550, which are imported at step 560 or exported at step 570 with regard to local machine 580.

As with the training objectives, training data includes a hierarchy of privacy rights. Data may be shared universally for comparison with a global community of users. This is typically implemented when training toward a public objective toward which many users are actively training. For example, AWS may manage an objective for gaining D1.1 certification. Any user who is training toward this objective may choose to share their data for the purpose of comparing their performance to that of others. Additionally, a user may wish to share data with a subset of users such as a high school class, for example. In this situation, data is shared within the class, but not with the global community at large. Other scenarios may require data to be maintained as private information. For example, a user may be training toward a certain manufacturing objective where maintaining a job or position is dependent on performance. In this case, data may only be available to the individual trainee and the instructor.

Figure 6:
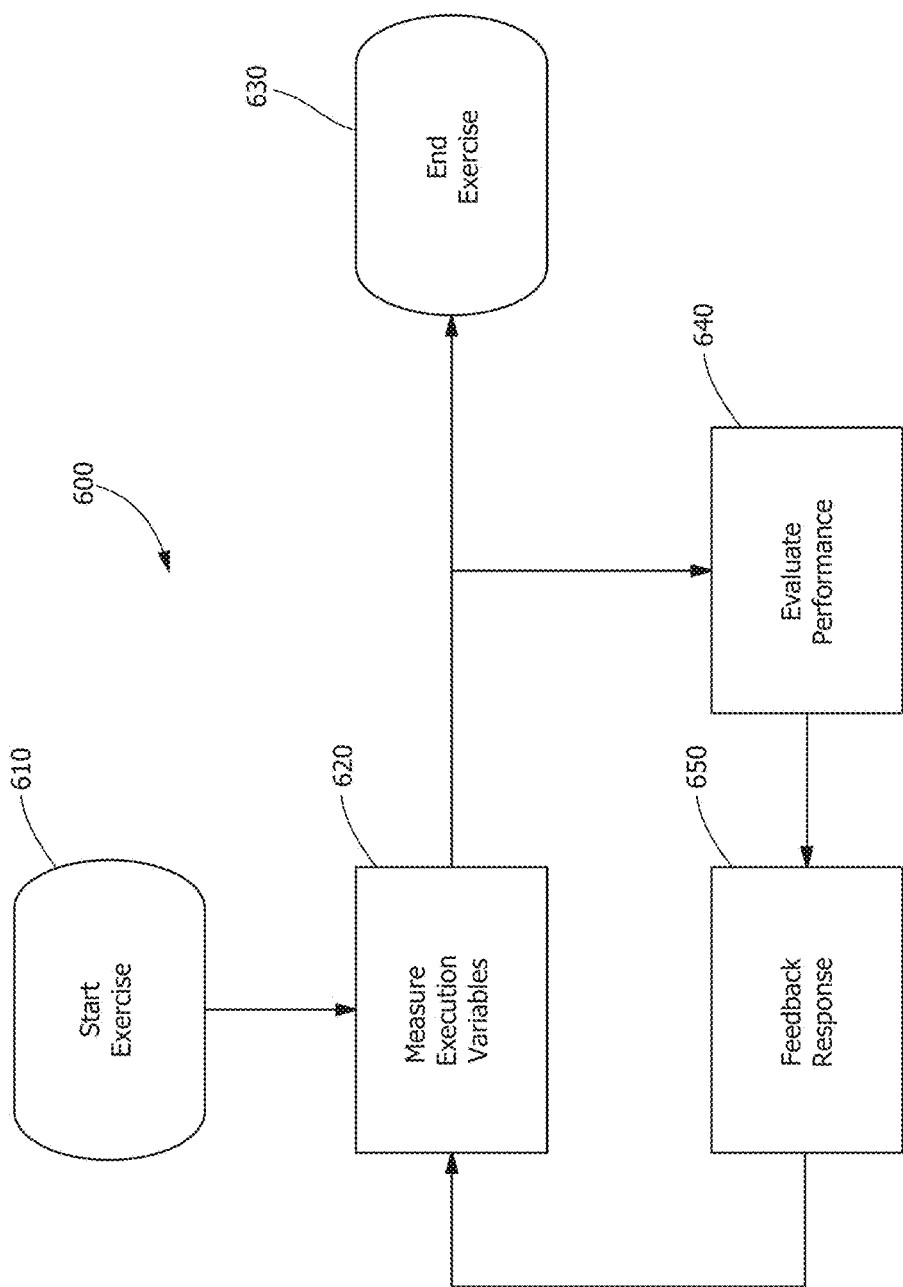
FIG. 6 is a flowchart of general real-time feedback provided by this invention.

As previously discussed, throughout the execution of a training exercise the user may or may not exploit the use of real-time feedback mechanisms at step 140. If real-time feedback is employed, the mechanism is carried out according to the general flow diagram of shown in FIG. 6. In an exemplary embodiment of this invention, real time feedback component 600 includes starting an exercise at step 610; measuring execution variables at step 620; ending the exercise at step 630 or evaluating performance at step 640; and providing a feedback response at 650. Performance is measured, analyzed, and a feedback response is generated to the user in real-time. The purpose of this mechanism is to (i) highlight the differences between acceptable and unacceptable performance while visualizing the execution task; (ii) prevent the user from manipulating the tool in a manner far-removed from the proper technique; and (iii) assist in guiding the user to the proper technique. This assists the user in building muscle memory for proper technique while avoiding bad habits that must eventually be eliminated. Four mechanisms of real-time feedback are included in this invention: (i) automated audio coaching; (ii) instructor-assisted audio coaching; (iii) transfer mode feedback; and (iv) augmented reality weld rendering. Each mechanism is described in greater detail below.

Figure 7:
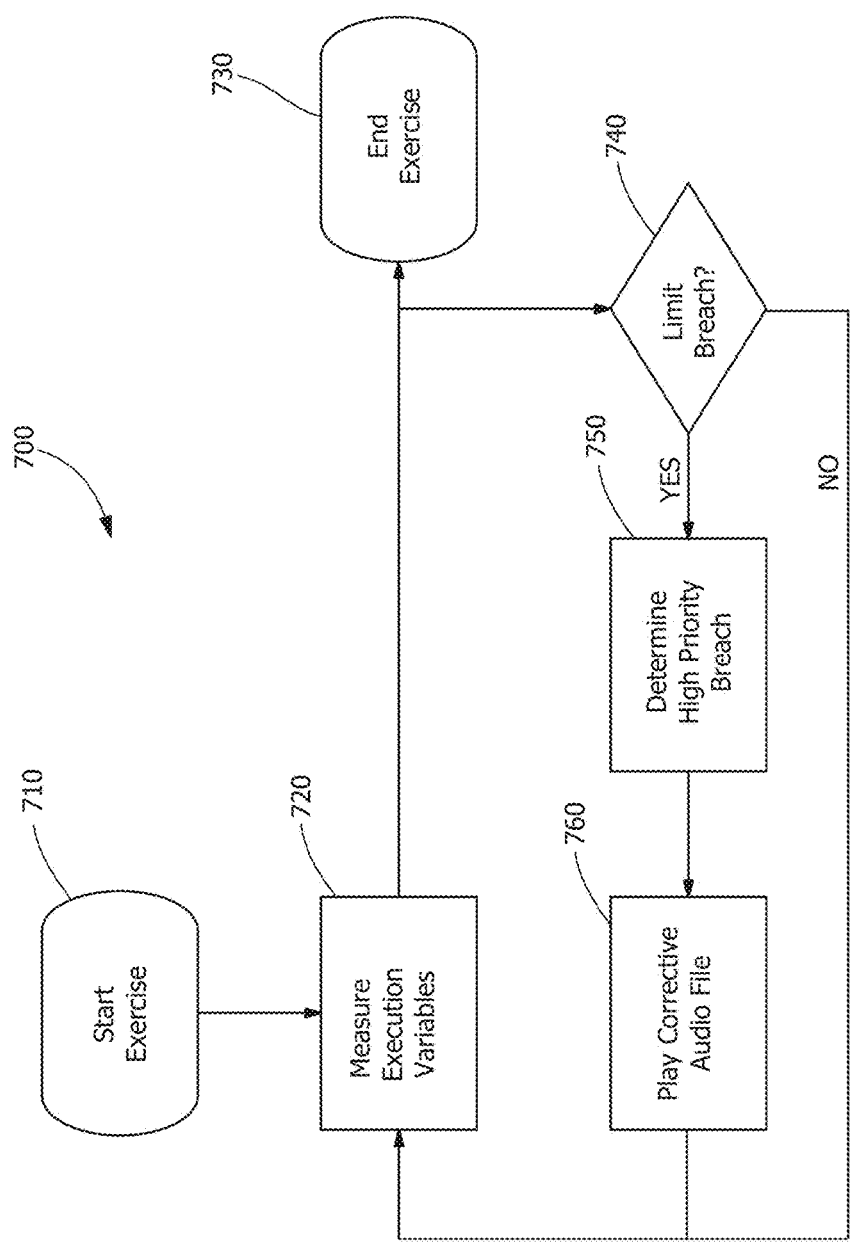
FIG. 7 is a flowchart of the automated audio coaching component of this invention.

With reference to FIG. 7, automated audio coaching entails a real-time feedback mechanism which provides feedback to the user through automated voice commands. In an exemplary embodiment of this invention, automated audio coaching component 700 includes starting an exercise at step 710; measuring execution variables at step 720; ending the exercise at step 730 or determining a limit breach at 740; determining a high priority breach at 750; and playing a corrective audio file at step 760. Prerecorded files are played depending which variables are outside of the control limits. As shown in Table 4 below, a hierarchy is established by which high-priority variables take precedence over lower priority variables. At any given data interpretation frame only one coaching command is executed based on the priority hierarchy (e.g., tool placement takes precedence over tool angle, which takes precedence over travel speed, etc.) Commands are direction-based, meaning that the commands coach the user into the direction of compliance (e.g. if the performance is breaching a lower boundary, the commands with coach the trainee to increase the given variable).

TABLE 4

Automated Audio Coaching Hierarchy

| Rank | Variable |
|---|---|
| 1 | Tool Placement |
| 2 | Tool Offset |
| 3 | Travel Speed |
| 4 | Work Angle |
| 5 | Travel Angle |

Figure 8:
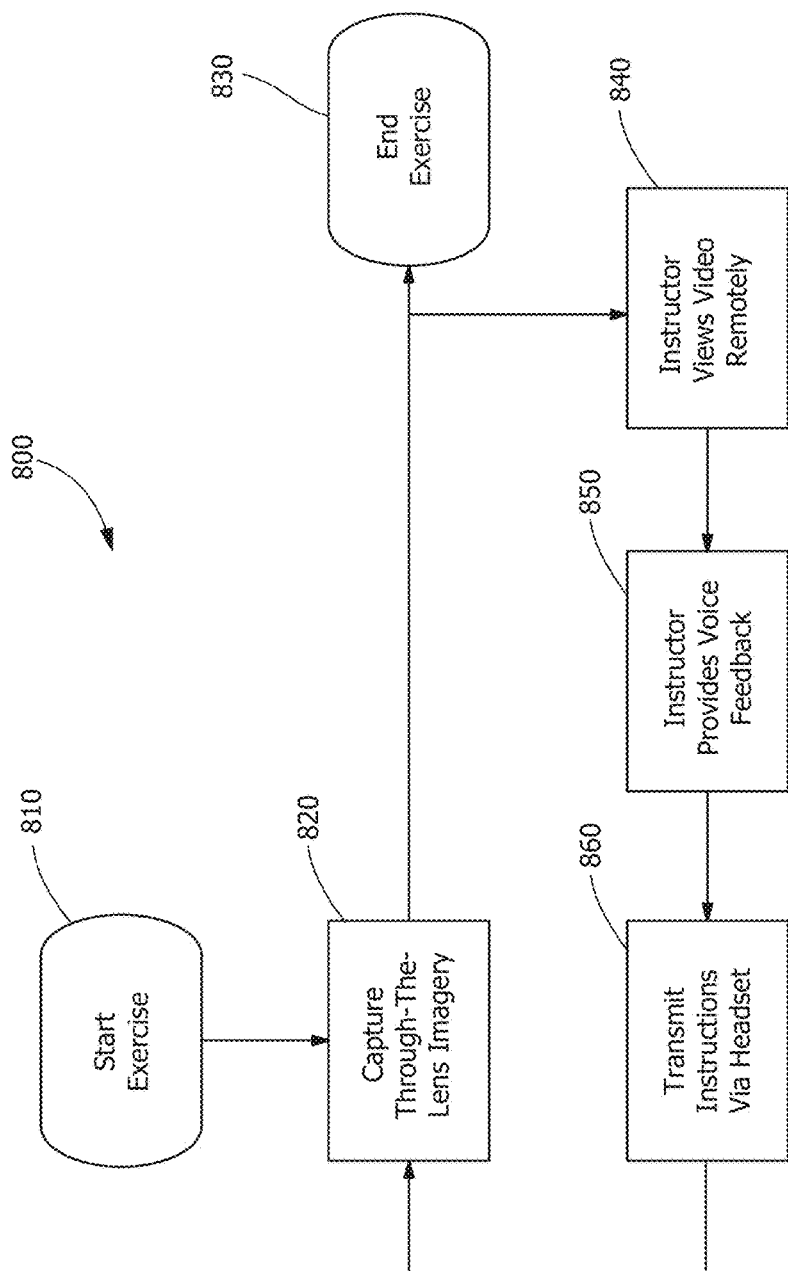
FIG. 8 is a flowchart of the remote instructor coaching component of this invention.

With reference to FIG. 8, remote instructor coaching is an interactive real-time feedback mechanism wherein the instructor remotely views live through-the-lens video of the trainee's performance and provides through-the-helmet audio feedback. In practice, a camera or set of cameras capture live images matching the welder's view through the welding lens. These images are transferred to a viewing portal operated by the instructor. The instructor can then view and analyze the trainee's technique. Based on the welder's performance, the instructor may relay live audio feedback from a microphone to a wireless headset within the trainee's welding helmet. This emulates an instructor 'looking over the shoulder' of the trainee. As shown in FIG. 8. in an exemplary embodiment of this invention, remote instructor coaching component 800 includes starting an exercise at step 810; capturing through-the-lens imagery at step 820; ending the exercise at step 830 or having an instructor view a captured video remotely at step 840; having the instructor provide voice feedback at step 850; and transmitting instructions by way of a headset at step 860.

Figure 9:
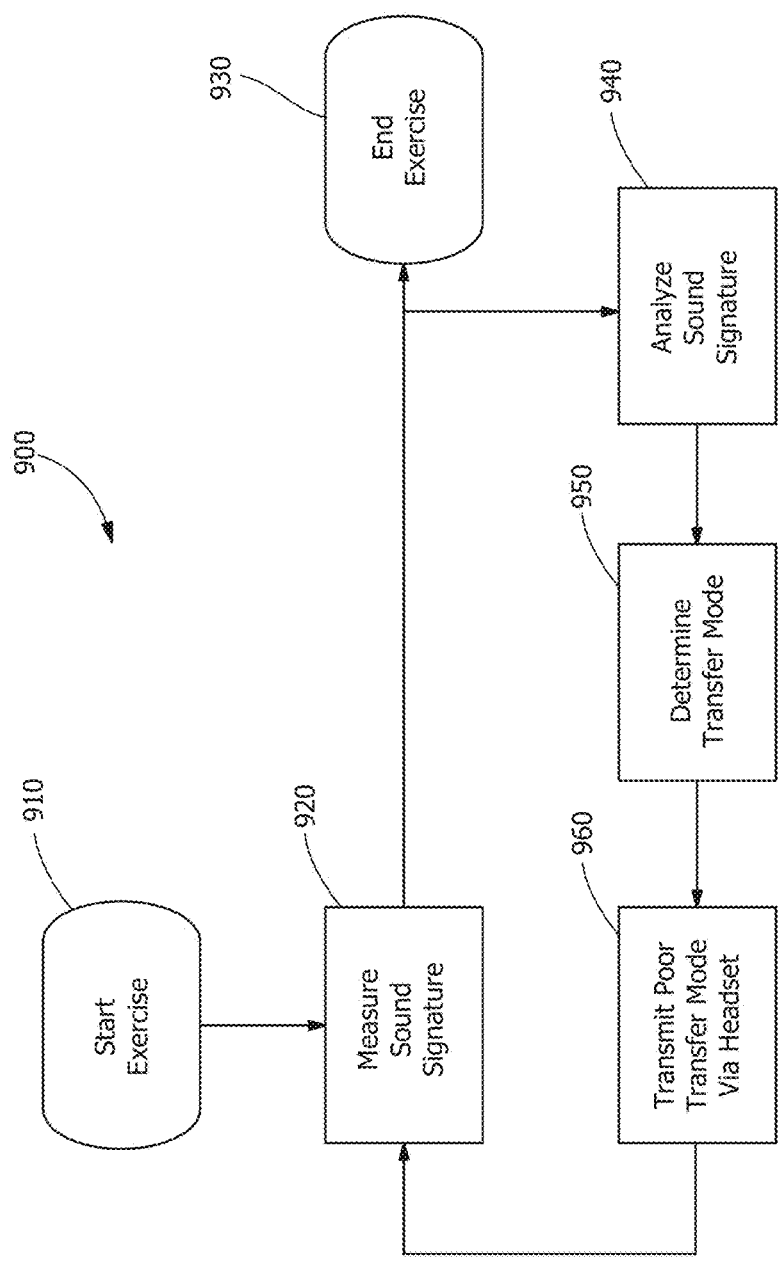
FIG. 9 is a flowchart of the transfer mode feedback component of this invention.

With reference to FIG. 9, transfer mode feedback is a real-time feedback mechanism that helps the trainee learn the differences between transfer modes. In an exemplary embodiment of this invention, transfer mode feedback component 900 includes starting an exercise at step 910; measuring a sound signature at step 920; ending the exercise at step 930 or analyzing the sound signature at step 940; determining a transfer mode at step 950; and transmitting the existence of a poor transfer mode by headset at step 960. This mechanism is only applicable in wire-fed arc welding processes like Gas Metal Arc Welding (GMAW) and Flux Cored Arc Welding (FCAW), as these processes manifest a transfer mode. The means of measuring the transfer mode is provided by a microphone integrated into the welding helmet. The sound signal signature is analyzed to determine the transfer mode as either short-circuit, globular, spray, or pulsed-spray.

Figure 10:
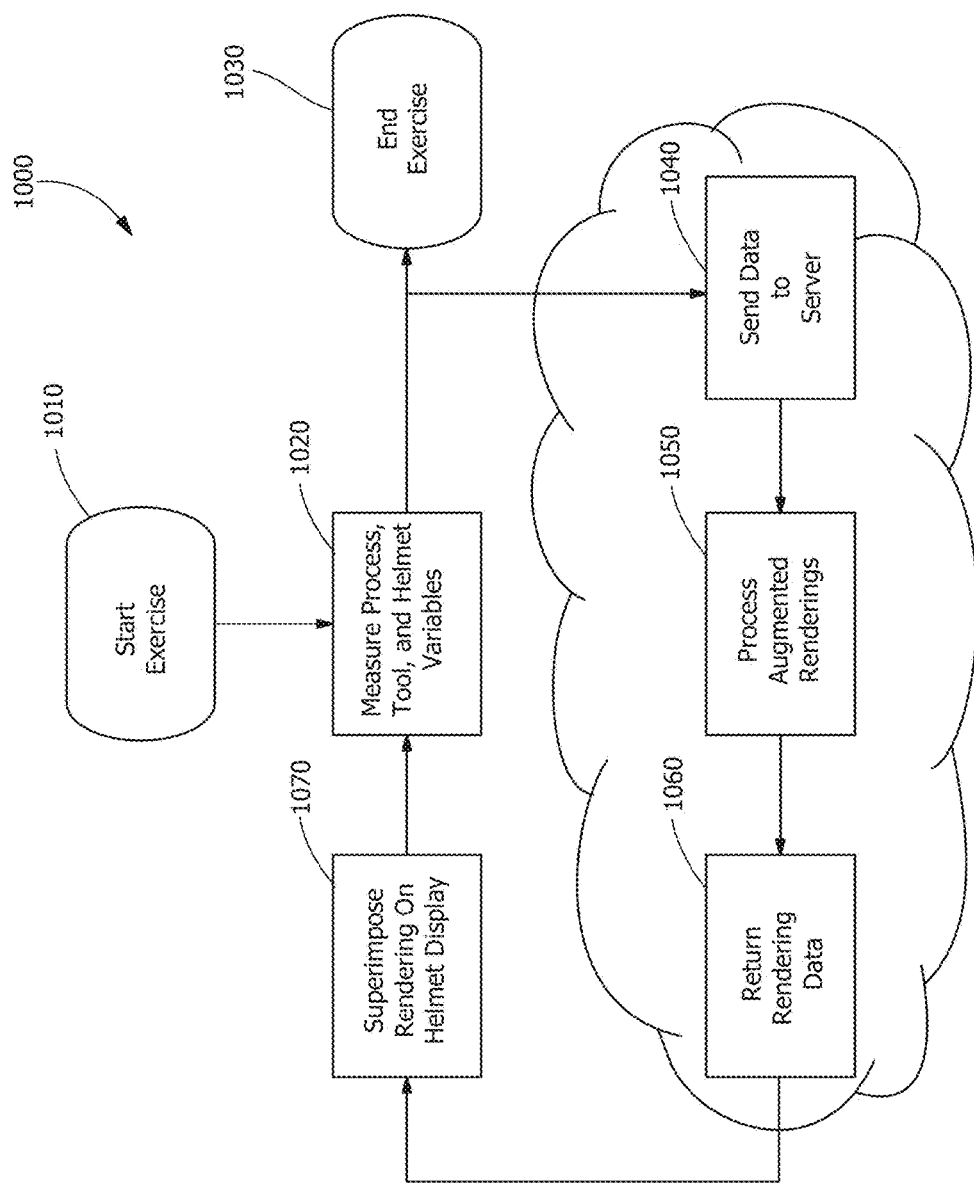
FIG. 10 is a flowchart of the augmented reality component of this invention.
Figure 11:
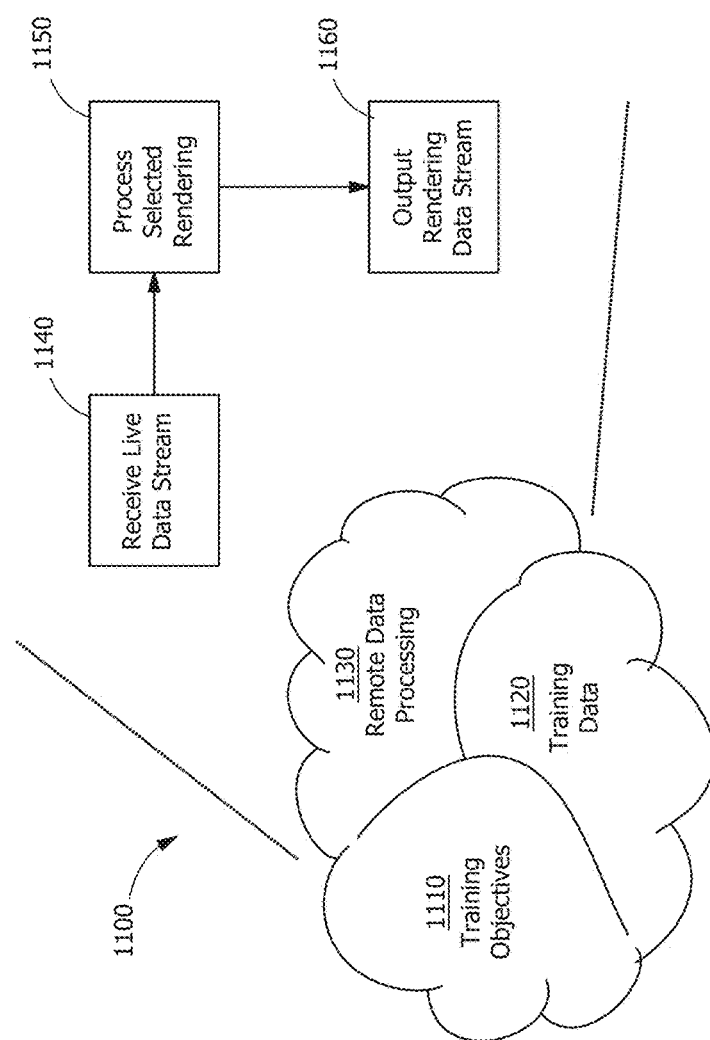
FIG. 11 is a diagram of a cloud-based server with a remote data processing breakout.

With reference to FIGS. 10-11, augmented reality provides a means of real-time feedback for both arc-off and arc-on training. In both cases, sensors provide real-time position and orientation values of both the welding helmet and the welding tool in addition to processing data to a cloud-based server. This server performs processor intensive rendering calculations and/or finite element calculations, feeding back to the local system image data to be superimposed over the trainee's view of the welding joint. FIG. 10 outlines the sensor and data flow for augmented reality. In an exemplary embodiment of this invention, augmented reality component 1000 includes starting an exercise at step 1010; measuring process, tool, and helmet variables at step 1020; ending the exercise at step 1030 or sending data to the server at step 1040; processing augmented reality renderings at step 1050; and returning rendered data at step 1060. For arc-off welding the superimposed imagery may include: a virtual welding arc and pool; 3D renderings of a virtual weld bead superimposed on the real weld joint; highlights of the welding joint root location; a pencil trace of the intersection location between the welding tool vector and the workpiece; and/or other features. For arc-on welding the superimposed imagery may include: target and actual weld pool shape and position (this is the first step is learning to manipulate a weld pool); target and actual arc placement within the joint; target and actual tool angles; target and actual tool offset; target and actual travel speed; live indication of defect formation along the weld; and/or other features. Like the training objectives, a cloud-based server is typically utilized to manage the data for augmented reality feedback. Specifically, the processing power of the server is utilized to take low data count information (process, tool, and helmet) in, to output image renderings that can be immediately superimposed on the user's see-through display. FIG. 11 illustrates remote data processing functionality 1100 of the present invention, wherein training objectives 1110, training data 1120, and remote data processing 1130 (all of which are cloud-based) are accessible by and in communication with aspects of the system that receive a live data stream at 1140; process selected renderings at 1150; and output a rendered data stream at 1160.

As indicated above at step 150, at the end of each training exercise the user is given the opportunity to evaluate welding performance. The type of performance evaluation may include: compliance with training goals; compliance with qualified procedure essential variables; variability compliance; compliance with weld quality specifications; compliance with standardized certification specifications; comparison to relative population; performance over time; work ethic; and/or other factors and measures of performance.

Assessing compliance with training goals may include upper and lower control limits for each variable, wherein deviations are flagged for analysis. Limits may vary along the length of the weld, for example, different start/stop regions on a straight weld or continuously changing angles for a 5G pipe weld. Limits may vary for different weld passes, for example, work angle, tip to joint distance and tip to joint offset may vary by pass on a horizontal fillet weld. Training goals may also include welding directions and sequence such as vertical up versus down. For example, backing up to fill a crater for aluminum welding; block welding, or "back-up" sequences to control distortion; sequence of joints to be welded on a complex part with multiple joints; and/or multi-bead overlays. The system is typically programmed by creating a series of vectors relative to the weld joint location by physically moving the torch from the vector start to the vector stop. For each vector has a position (with +/− tolerance on start location), direction (with tolerance on the angular direction relative to the joint), and length (with +/− tolerance). Training goals may also include weave parameters. Three parameters are used to characterize the weave: weave width, weave advancement, and weave frequency. A low-pass filter (e.g., averaging) is applied to the positional data to smooth the data and then extreme side to side variations (relative to the overall direction of travel). These three weave parameters are then compared to upper and lower limits like any other parameter. With regard to analysis, all parameters must be simultaneously within acceptance limits for that portion of weld to be deemed in compliance. The percentage of the weld (by length or time) that all parameters are in compliance is used to assess the overall score and the start time/distance necessary to achieve the steady-state may be calculated.

Assessing consistent compliance with qualified procedure essential variables may include an archive of welding standards and approved procedures for particular applications which may be stored in a database, accessible across a network, and take the form of a procedure qualification record (PQR) or a welding procedure specification (WPS). Welding standards may impose limits on particular parameters (essential variables) to meet weld property, quality, or productivity requirements and fields within the database record identify the restrictions for a given procedure. Examples include welding range of current, range of voltage, range of speed, wire-feed speed, travel speed, weave width, maximum heat input (calculated), range of weld bead size (calculated), mode of metal transfer (inferred from arc signal). The system also measures actuals and identifies deviations beyond the limits. For example, actual welding heat input is above the maximum allowable welding heat input. Welding heat input is calculated from the measured welding current, voltage, and travel speed. The system also statistically analyzes the data. Any deviation from an essential variable makes the weld "rejectable". Deviations identified for a given weld and location are identified. Results from multiple welds are used to evaluate trends (e.g., the trainee must demonstrate consistent compliance with the procedure requirements over time to score highly). The system also archives the result and displays to the user, which may be used to send warning to welder/supervisor, and trigger an inspection on a particular weld. Ongoing deviations flag performance issue to be rectified (e.g., additional training) and scores reflect the ability to comply with essential variables over time. The system also provides tutorials on the importance of the parameter for the procedure, and how performance should be adjusted to comply with the procedure requirements.

Assessing variability involves the variation in the motion measurements gives an indication of the trainee's fluidity of motion. A score is based on normalized maximum variation of each parameter from a mean. This may be calculated over a moving time window (e.g., 5 seconds) or the entire weld. Alternatively, frequency analysis methods (e.g., FFT) may be applied to identify the high-frequency components in the power spectrum. This may be compared with a preferred frequency distribution. In this case, gradual changes in torch positioning (e.g., changes to travel angle for 5G pipe welding) would be ignored in the calculation. Also, an optimum weave frequency could be used as a base-line for comparison. Transient areas (start/stops) would be ignored in these calculations.

Assessing weld quality directly includes various methods for capturing weld quality information. The trainee/instructor is asked to visually inspect the weld, and the result is archived. This may include a displayed image of the weld, and the user dropping icons on the weld to record quality indications (e.g., porosity, weld size, etc.). The data is automatically archived. Alternatively, laser profilometry may be used to inspect the surface of the weld and the data is archived. Another alternative includes capturing a digital photo/video of weld and archiving the data. Post weld non-destructive inspection of a serialized weld may also be completed and the result may be linked to the database record. With regard to the overall analysis, the measurements may be compared with targets to assess the ability of the welder to achieve desired weld bead characteristics. By relating these quality measurements to the welder technique, the welder can learn the relationship between technique and quality. When direct weld quality measurements are available, these may be used to automatically adapt the control limits over time to map-out the range of techniques which produce acceptable welds (i.e., the system learns the optimal combinations which produce acceptable welds). For example, if many welds are made with slightly different techniques, the techniques which result in unacceptable weld quality would be judged to be outside of optimal performance criteria.

Assessing weld quality with compliance to a training certification links the training performance with mechanical testing and NDE results in one database and walks the trainee through the entire qualification process. Assessing weld quality with compliance to a training certification may also include types of welds to be practiced (parameters, etc.); testing coupons; mechanical testing results, etc. An authorized official typically performs the sign-off on acceptance of the certification results. With regard to assessing performance relative to a population, data is compared with online databases including information from individual in the following types of groups: class, grade level, industry sector, etc. With regard to assessing performance improvement over time, data is compared to a benchmark learning speed; data from one time period is compared to a pervious time period to measurement improvement or lack thereof; and the rate of learning is used to determine an aptitude for a particular manual welding technique. With regard to assessing work ethic, the system measures time spent manipulating a tool versus the total time allocated for training and the system differentiates tool manipulation time into 'arc off' and 'arc on' durations.

As previously indicated, the curriculum component of the present invention may be adapted as step 160. In addition to providing the user with exercise-by-exercise performance evaluations, the training methodology also uses the trainee's performance to dynamically adjust targets exercise-by-exercise. The training methodology uses intelligent learning functions to customize the training progression to the trainee's actual progress. The objective of the adaptive curriculum is to guide the trainee's development, providing both a means for fast-tracked learning and remedial training where necessary. This is carried through a number of mechanisms, including: dynamic control limits; dynamic adjustment of active WPS; dynamic variable enablement; dynamic mode enablement; dynamic tutorials; disparate segments within the weld; position-based dynamic control limits; and integrated quizzes.

With regard to dynamic adjustment of active WPS, as the trainee masters a given welding procedure, the system automatically advances the trainee to the next WPS in the curriculum. If the trainee is struggles with the active WPS, the system automatically shifts the trainee backwards to a previous WPS for remedial training (moving from 'world' to 'world'). With regard to dynamic variable enablement, if the trainee is struggling specifically with one or more variables, the system recognizes this and automatically shifts the enablement of variables to be one at time, two at time, etc. With regard to dynamic mode enablement, the system forces the trainee to first master the optimal performance criteria in the arc-off mode prior to enabling the arc-on mode. Regarding dynamic tutorials, the system recognizes the student struggling with compliance on certain variables and automatically offers tutorials on focused on the variables (i.e., travel speed is always too high, offer a tutorial on posture for stabilizes speed, or a macro of a weld with high speed, etc.). Additionally, as the trainee progresses to a new WPS with a new joint, position, process, etc., tutorials are offered on those new welding situations. Additionally, the system will recognize defect formation and offer tutorials on what the defects are and how they can be mitigated. Quizzes may be integrated into the system to test classroom comprehension of basic welding principles.

As previously indicated, the trainee may earn credentials at step 170. The final stage in the training methodology is realized once all of the training objectives have been completed. Like other aspects of the methodology of this invention, the acquired credentials are dependent on type of training objectives selected. Table 5 below lists various types of credentials.

TABLE 5

Typical Environments and Credentials for Manual Welder Training

| Environment | Example Credential |
| --- | --- |
| High school welding class | Obtain a passing grade for high school credit |
| Trade school welding class | Obtain a passing grade for trade school credit |
| Union training program | Industry-based certifications and job placement |
| Manufacturer-based qualification | Job placement |

Figure 12:
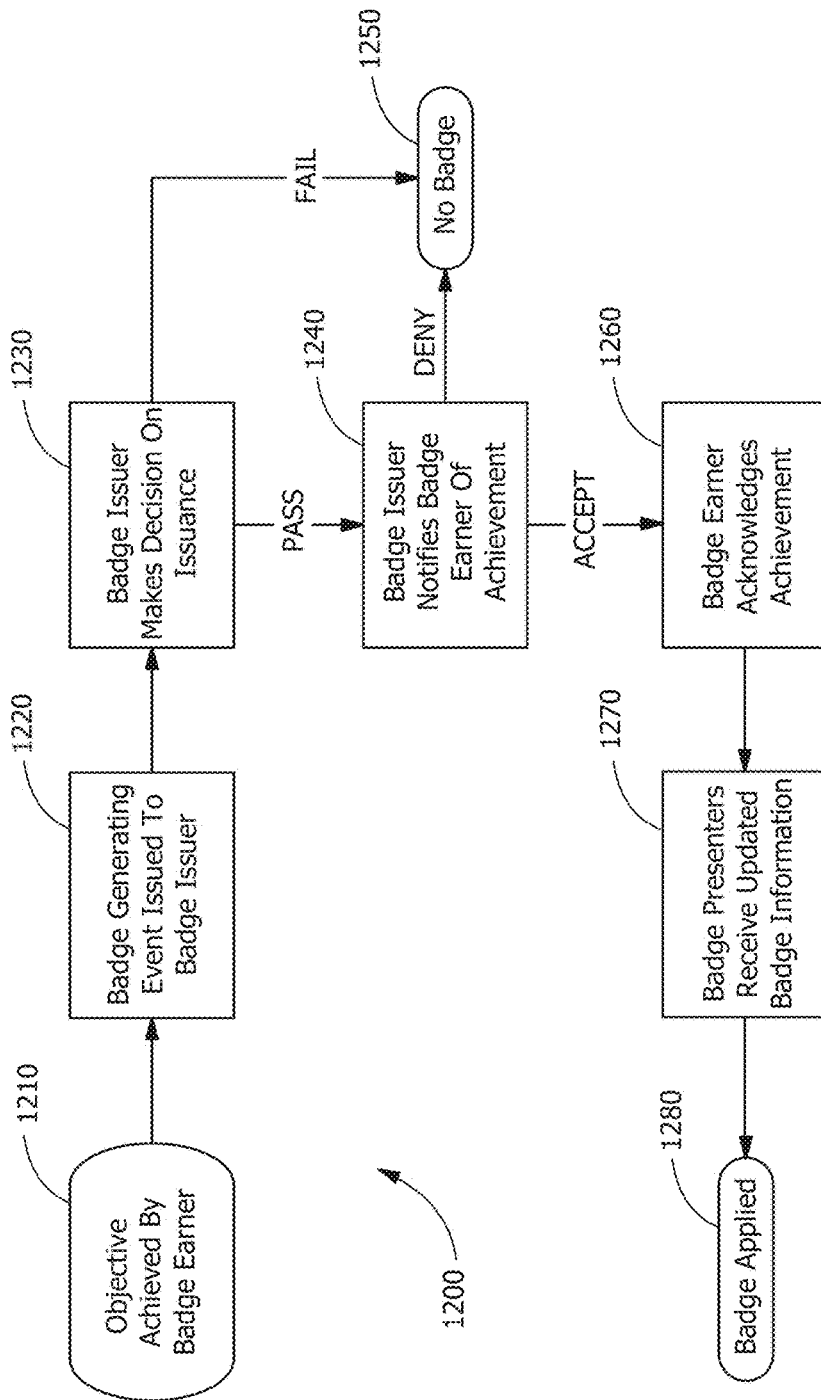
FIG. 12 is a flowchart of an exemplary embodiment of the credentialing aspect of the present invention.

The credentialing aspect of this invention includes a methodology that allows for portable credentialing sanctioned by numerous credentialing agencies, but managed by way of a single system that measures one or more key performance metrics of welding proficiency. These credentials or "badges" are mobile, meaning they can be used as a disclosure of skill wherever they are recognized. They may also carry some form of equivalency from one credentialing agency to the next. The core constituents of this methodology include badge earners, badge event generators, badge issuers, and badge presenters. FIG. 12 illustrates one embodiment of this methodology and the respective role of each constituent. In this embodiment, credentialing component 1200 includes identifying an objective achieved by a badge earner at step 1210; notifying a badge issuing entity of the occurrence of a badge-generating event at step 1220; making a decision (by the badge issuer) regarding issuance of a badge at step 1230; notifying (by the badger issuer) the badge earner of the achievement at step 1240; denying the issuance of a badge at 1250 or acknowledgement (by the badger earner) of the achievement at step 1260; receiving (by badger presenters) updated badge information at step 1270; and applying the badge at step 1280. When a badge earner achieves the sanctioned welding objective, an email is formatted by the badge generating device with all the pertinent information on the objective including (i) the badge earner's name; (ii) the badge earner's email address; (iii) the badge earner's unique ID; (iv) the objective; and (v) relevant performance data. The badge issuer then examines the performance data and makes the determination as to whether or not the performance data meets the criteria for generating the badge. Badge issuers may typically be any entity that sanctions, requires, or approves of the obtaining of welding proficiency (e.g., AWS, IIW, trade schools, high schools, and industrial manufacturer, etc.). If the performance data is satisfactory, a notification is provided to the badge earner on the successful achievement. This notification typically then involves an affirmative acceptance by the badge earner before the badge is officially sanctioned and badge presenters receive updated badge information on the badge earner. These presenters include entities similar to various social media, the issuers themselves, or other appropriate entities.

While the present invention has been illustrated by the description of exemplary embodiments thereof, and while the embodiments have been described in certain detail, it is not the intention of the Applicant to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the applicant's general inventive concept.

What is claimed:

1. A welding system comprising:
(a) a data generating component, said data generating component comprising:
(i) a fixture, wherein the geometric characteristics of the fixture are predetermined;
(ii) a workpiece adapted to be mounted on the fixture, wherein the workpiece includes at least one joint to be welded, and wherein a vector extending along the joint to be welded defines an operation path;
(iii) a calibration device, wherein the calibration device includes at least two first point markers integral therewith, and wherein the geometric relationship between the first point markers and the operation path is predetermined; and
(iv) a welding tool, wherein the welding tool is operative to form a weld at the joint to be welded, wherein the welding tool defines a tool point and a tool vector, and wherein the welding tool includes a target attached to the welding tool, said target including a plurality of second point markers mounted thereon in a predetermined pattern, and wherein the predetermined pattern of the second point markers is operative to define a rigid body;
(b) a data capturing component, said data capturing component comprising an imaging system for capturing images of the point markers; and
(c) a data processing component, said data processing component operative to receive information from the data capturing component and then calculate:
(i) the position and orientation of the operation path relative to a three-dimensional space viewable by the imaging system;
(ii) the position of the tool point and orientation of the tool vector relative to the rigid body; and
(iii) the position of the tool point and orientation of the tool vector relative to the operation path,
wherein the welding system is operable to:
process data derived from an actual welding exercise conducted by a welding trainee;
receive one or more training objectives from a plurality of predefined objectives;
initialize a curriculum for the welding trainee, said curriculum being based on the training objectives;
monitor performance of a training exercise, wherein the training exercise is based on or is a component of the curriculum, said training exercise includes at least one execution task;
provide real-time feedback to the welding trainee, said real-time feedback being based on the performance of the welding trainee during the training exercise;
evaluate a performance of the welding trainee based on weld quality data collected during the training exercise; and
automatically modify the curriculum based on the performance of the welding trainee.

2. The welding system of claim 1, wherein the welding system is operable to award credentials to the welding trainee following successful completion of the curriculum.

3. The welding system of claim 2, wherein the awarding of credentials includes the awarding of portable badges, wherein the portable badges are awarded to the welding trainee based on the successful completion of one or more aspects of the curriculum, and wherein the successful completion of one or more aspects of the curriculum is recognized by one or more credentialing agencies or entities as representing at least one measurement of key performance metrics of welding proficiency.

4. The welding system of claim 1, wherein the welding system is in communication with at least one cloud-based server.

5. The welding system of claim 1, wherein the training objectives include one or more public objectives, private objectives, and combinations thereof.

6. The welding system of claim 1, wherein the curriculum includes a series of predetermined tasks, and wherein the tasks are in the form of welding procedure specifications.

7. The welding system of claim 1, wherein the curriculum includes one or more form variables, and wherein the form variables include one or more of: a process type; a joint type; a position; a material type; a thickness; a root gap; a root landing; an included angle; and combinations thereof.

8. The welding system of claim 1, wherein the curriculum includes one or more execution variables, and wherein the execution variables include one or more of: a polarity; an electrode type; a work angle; a travel angle; an arc length; a travel speed; a tool placement; a current; a voltage; a weld size; or combinations thereof.

9. The welding system of claim 1, wherein the curriculum includes one or more tasks for quizzes and tutorials, mechanical testing for certification objectives, and cleaning and joint preparation tasks.

10. The welding system of claim 1, wherein the training exercise is performed in either arc-off mode or arc-on mode.

11. The welding system of claim 1, wherein the real-time feedback is operative to highlight the differences between acceptable and unacceptable performance while allowing the welding trainee to visualize the at least one execution task, prevent the welding trainee from manipulating the welding tool in an improper manner, and guide the welding trainee to proper welding technique.

12. The welding system of claim 1, wherein the real-time feedback includes at least one of automated audio coaching, instructor-assisted audio coaching, transfer mode feedback, augmented reality weld rendering, and combinations thereof.

13. The welding system of claim 12, wherein the automated audio coaching includes real-time feedback in the form of automated voice commands, and wherein the automated voice commands include prerecorded audio files that are played to the welding trainee based on predetermined variables being outside of set control limits.

14. The welding system of claim 13, wherein the predetermined variables are arranged in a hierarchy of high-priority variables to low-priority variables, and wherein the predetermined variables include in descending order of priority: a tool placement, a tool offset, a travel speed, a work angle, and a travel angle.

15. The welding system of claim 12, wherein the instructor-assisted audio coaching includes interactive real-time feedback wherein an instructor remotely views the trainee during the training exercise through a welding lens used by the welding trainee, and wherein the instructor relays live audio feedback from a microphone to a wireless headset within a welding helmet worn by the welding trainee.

16. The welding system of claim 12, wherein the transfer mode feedback provides real-time feedback for helping the welding trainee learn differences between transfer modes when transfer modes are present, wherein a microphone integrated into a welding helmet worn by the welding trainee measures the transfer mode by detecting a sound signal signature, and wherein the sound signal signature is then analyzed to determine if the transfer mode is short-circuit, globular, spray, or pulsed-spray.

17. The welding system of claim 12, wherein the augmented reality weld rendering includes the use of sensors that provide real-time position and orientation values of both a welding helmet worn by the welding trainee and a welding tool used by the welding trainee in addition to processing data gathered during the training exercise to a cloud-based server, wherein the cloud-based server performs rendering calculations or finite element calculations, and wherein image data is generated based on these calculations and is superimposed over the welding trainee's view of a welding joint being created during a welding exercise.

18. The welding system of claim 17, wherein the training exercise is performed in arc-off mode, and wherein the superimposed imagery includes one or more of a virtual welding arc and pool, 3D renderings of a virtual weld bead superimposed on the real weld joint, highlights of the welding joint root location, and a pencil trace of the intersection location between the welding tool vector and the workpiece.

19. The welding system of claim 17, wherein the training exercise is performed in arc-on mode, and wherein the superimposed imagery includes one or more of target and actual weld pool shape and position, target and actual arc placement within the joint, target and actual tool angles, target and actual tool offset, target and actual travel speed, and live indication of defect formation along the weld.

20. The welding system of claim 1, wherein the performance evaluation includes one or more of an assessment of compliance with training goals, compliance with qualified procedure essential variables, variability compliance, compliance with weld quality specifications, compliance with standardized certification specifications, comparison to relative population, performance over time, and work ethic.

21. The welding system of claim 20, wherein the assessment of compliance with training goals includes assessing upper and lower control limits for one or more of predetermined variables, welding directions and sequence, and weave parameters.

22. The welding system of claim 20, wherein the assessment of compliance with qualified procedure essential variables includes use of an archive of welding standards and approved procedures for particular applications which are stored in a database, accessible across a network, and take the form of a procedure qualification record or a welding procedure specification.

23. The welding system of claim 20, wherein the assessment of variability compliance includes assessing variations in motion measurements taken from the welding trainee, and wherein the variations provide an indication of the welding trainee's fluidity of motion.

24. The welding system of claim 20, wherein the assessment of compliance with weld quality specifications includes one or more of visual inspection of a completed weld, laser profilometry, capturing digital photos or videos of the completed weld, and post weld non-destructive inspection.

25. The welding system of claim 1, wherein the curriculum is adaptive, and wherein the adaptive curriculum includes one or more dynamic control limits, dynamic adjustment of active welding procedure specifications, dynamic variable enablement, dynamic mode enablement, dynamic tutorials, disparate segments within the weld, position-based dynamic control limits, and integrated quizzes.

* * * * *